United States Patent [19]
Oda

[11] Patent Number: 5,646,377
[45] Date of Patent: Jul. 8, 1997

[54] POINT DETECTING DEVICE AND METHOD OF SAME

[76] Inventor: Yasuo Oda, c/o Wacom Co., Ltd. 2-510-1 Toyonodai, Otone-machi, Kitasaitama-gun, Saitama, 349-11, Japan

[21] Appl. No.: 394,791

[22] Filed: Feb. 16, 1995

[30] Foreign Application Priority Data

Apr. 8, 1994 [JP] Japan .................... 6-095611

[51] Int. Cl.$^6$ .................... G08C 21/00; G09G 3/02
[52] U.S. Cl. .................... 178/18; 178/19; 345/156; 345/173; 345/179
[58] Field of Search .................... 178/18, 19, 20; 345/156, 173, 179

[56] References Cited

U.S. PATENT DOCUMENTS

| | | | |
|---|---|---|---|
| 4,617,515 | 10/1986 | Taguchi | 178/18 |
| 4,806,708 | 2/1989 | Yahagi | 178/18 |
| 4,818,851 | 4/1989 | Kimura | 178/19 |
| 4,948,926 | 8/1990 | Murakami | 178/19 |
| 4,999,461 | 3/1991 | Murakami | 178/19 |
| 5,028,745 | 8/1991 | Yamanami | 178/19 |
| 5,120,907 | 6/1992 | Shinbori | 178/18 |

FOREIGN PATENT DOCUMENTS 3-147012  6/1991  Japan .

Primary Examiner—Wellington Chin
Assistant Examiner—Vijay Shankar

[57] ABSTRACT

The invention relates to a point detecting device and a method for providing coordinate information which is indicated by a pointing device. This point detecting device is adapted for a large scaled system which is required to be operated at a low cost and at high accuracy. The point detecting device transmits signals from both ends of the loop coil arrangement towards the pointing device, and/or receives at both ends the signals generated by the electromagnetic function between the loop coil arrangement and the pointing device. The errors owing to the variations caused in the signal level and phase in response to the propagation constant of the loop coil arrangement can be reduced by adding the received signal pair.

38 Claims, 18 Drawing Sheets

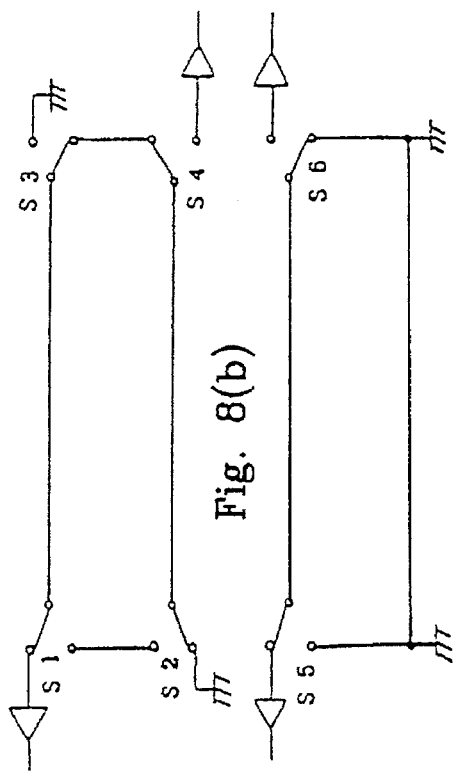
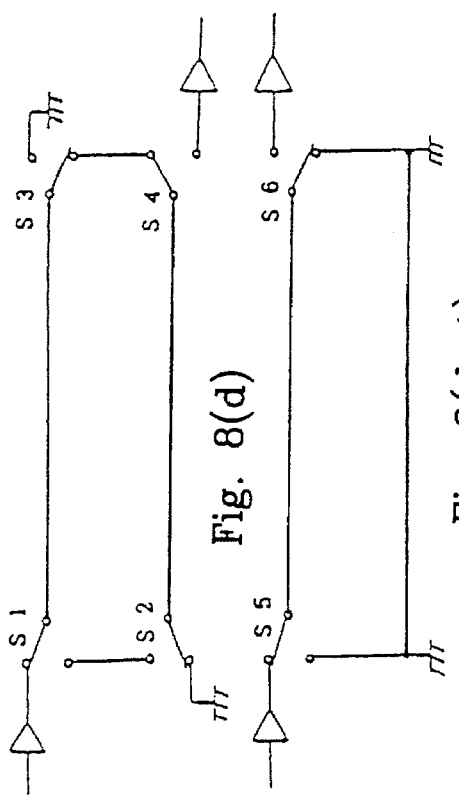
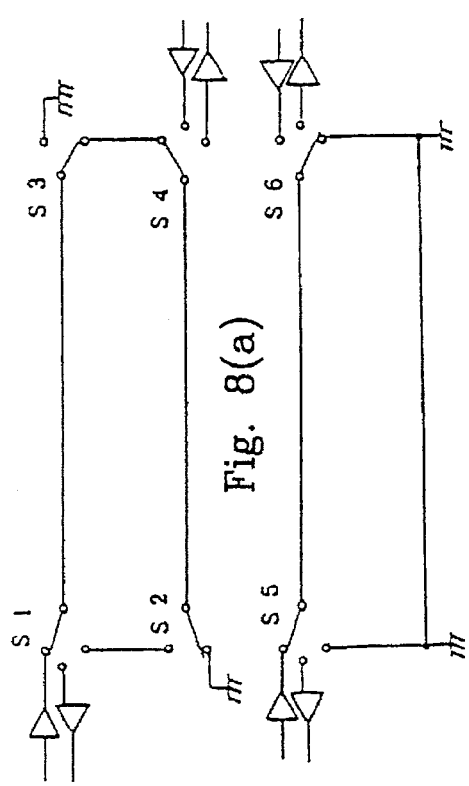
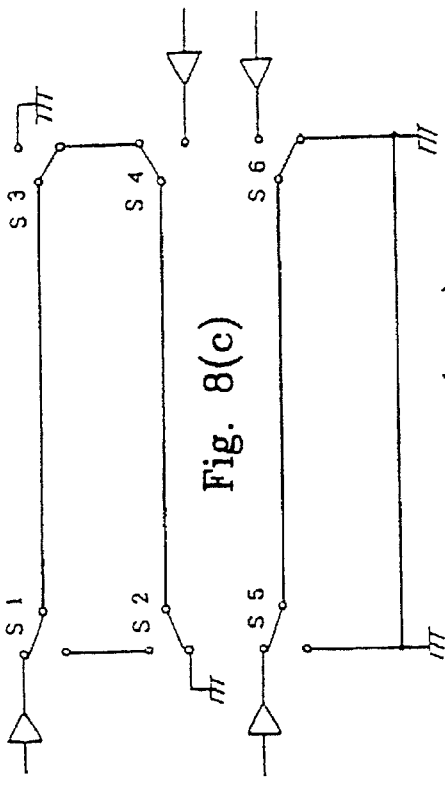

Fig. 10(a)
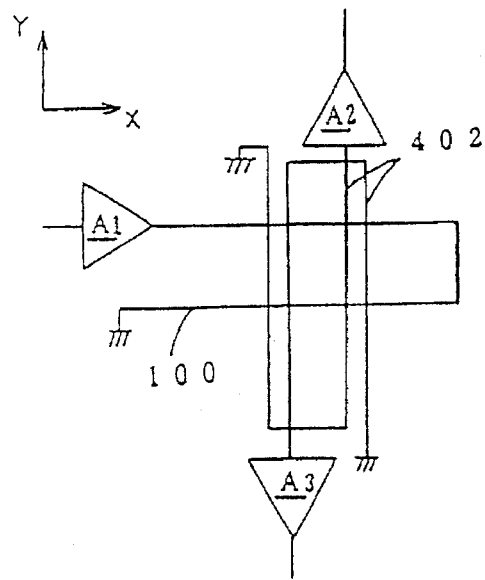
Fig. 10(a-1)
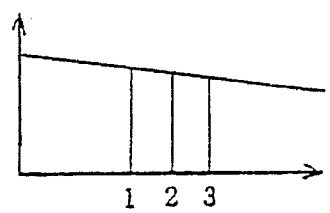
Fig. 10(b)
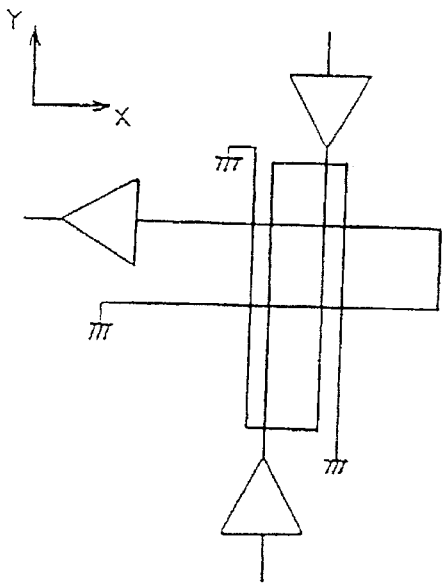
Fig. 10(c)
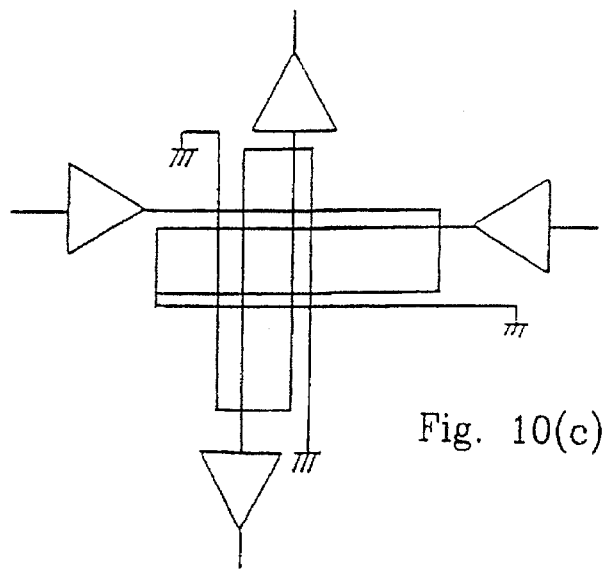

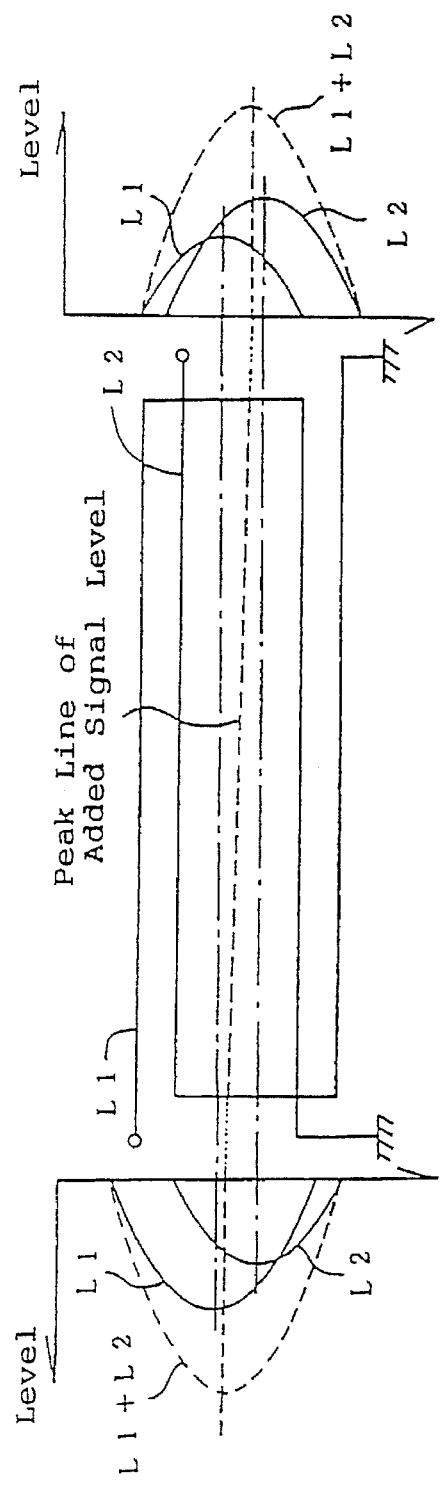
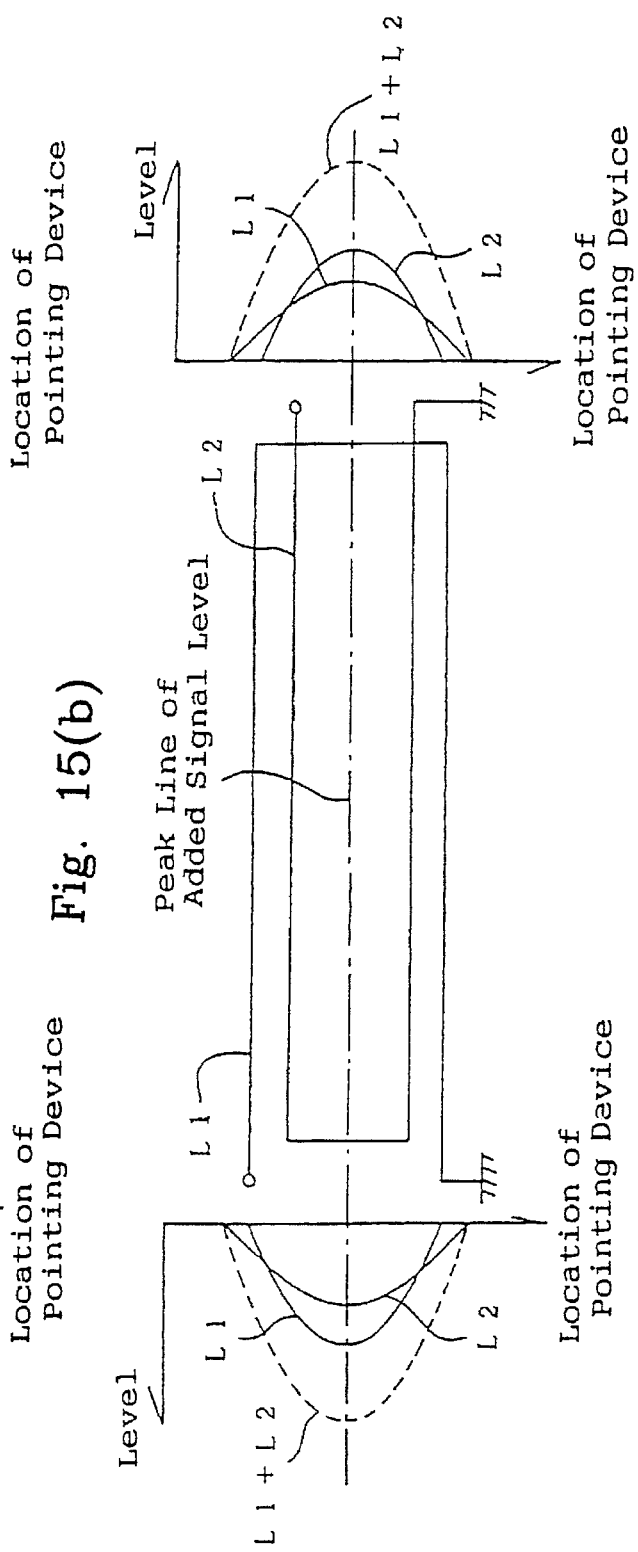
Fig. 15(a)
Fig. 15(b)

POINT DETECTING DEVICE AND METHOD OF SAME

BACKGROUND OF THE INVENTION

1. Field of the Invention

The present invention relates generally to a point detecting device and a method for providing locational information such as coordinate information which is indicated by a pointing device. The present invention especially relates to a point detecting device adapted for a large scaled system which is required to be operated at low cost and at high accuracy.

2. Description of the Prior Art

Conventionally, in various computer-aided working fields such as computer graphics and computer aided design, it has been common knowledge to use various point detecting devices which analyze electrical signals generated by electro-magnetic means energized by a point detecting device to provide locational information pointed out by the pointing device.

A typical example of conventionally used point detecting devices is composed of a sensor unit including a plurality of loop coils which are arranged in parallel with each other in the direction to be detected, and a pointing device including at least one tuning circuit. Any one of the loop coils is selected and energized by an AC signal to generate an electromagnetic wave so that the tuning circuit included in the pointing device is energized by the electromagnetic wave. Since this energized tuning circuit also generates electromagnetic wave, the above selected loop coil receives this electromagnetic wave from the tuning circuit thereby resulting in induced voltage. This induced voltage is detected as a first received signal. This operation will be repeated by succeedingly selecting one by one from the loop coil series to detect amplitude and phase angle of the respective received signals. The data thus obtained is calculated to provide locational information such as the coordinate value representing the point pointed by the pointing device.

In order to detect the amplitude and phase angle of respective received signals, there are two commonly known methods one of which is based on analog phase detection as referred to by Japanese Patent Application Open to Public Inspection No. 63-70326 (1988) and the other is based on high speed AD transform and discrete Fourier-transform as referred to by Japanese Patent Application Open to Public Inspection No. 3-147012 (1991).

The above described sensor unit will be further described in detail. As discussed above, conventional sensor units include a plurality of loop coils each one of which is formed in a substantially rectangular shape (winding number of the coil is not limited), which are arranged in parallel in the position detecting direction, for example, X-axis direction. In order to perform point-detection in dual axes for example X and Y axes, such the loop coil configuration is respectively arranged in X and Y axes directions. Each one of the loop coils is associated with a pair of a signal transmitter and a signal receiver. The transmitter and receiver pair are located at either side of the longitudinal ends of the loop coil. According to this configuration, if the transmitter is transmitting a signal to the associated loop coil and a pointing device is located on this loop coil, then the pointing device will generate a signal due to electromagnetic mutual function between the pointing device and the transmitted signal. Then this signal from the pointing device will be detected by the signal receiver.

In alternative configuration, either the transmitter or receiver only is arranged to the loop coil side.

In the case of only the transmitter, a pointing device is provided with a receiver mechanism and the transmitter is arranged at one of the longitudinal ends of the loop coil. According to this configuration, if the transmitter is transmitting a signal to the associated loop coil and the pointing device is located on this loop coil, then the pointing device will generate a signal due to the electromagnetic mutual function between the pointing device and the transmitted signal. Then this signal from the pointing device will be detected by the receiver mechanism included in the pointing device.

In the case of only the receiver, a pointing device is provided with a transmitter mechanism and the receiver is arranged at one of the longitudinal ends of the loop coil. According to this configuration, if the transmitter mechanism of the pointing device is transmitting a signal to the coil of the pointing device, then the pointing device will generate a signal due to electromagnetic mutual function between the pointing device and the loop coil under the pointing device. Then this signal from the pointing device will be detected by the receiver associated with this loop coil.

In addition to the above described configuration, Japanese Patent Application Open to Public Inspection No. 5-241722 (1993) discloses an example of point detecting device which makes a pointing device generate self vibration by forming a normal feedback loop of an amplifier when this pointing device is electromagnetically coupled with two coupling means which are prohibited from coupling with each other, and thus the self vibration is detected as a point signal of the pointing device.

As practical examples of the above described point detecting devices, there is known a tablet and a touch display used as an input device for various computer systems. Their sensor section generally does not have a large area, rather than the range from type B-5 to A-4 on size of paper sheet in Japanese Industrial Standard. Furthermore, there are a few examples of a large scaled point detecting device such as an electronic black board whose sensor requires the large area as well as from type A-2 to A-0.

Referring to FIG. 22, there is shown an example of signal detecting operation in a conventional manner. This drawing represents that a signal Vc is induced by the electromagnetic function between a pointing device at a point P and a loop coil, and the signal Vc is detected as a signal V by a receiver arranged at one end O of the loop coil. Generally, in point detecting devices constituted in this manner, each loop coil has a longer loop elongated along one axis. This type of loop coil can be treated as a uniform distributed constant circuit. When electric energy such as voltage or current is transmitted through a uniform distributed constant circuit, the intensity (level) of this electric energy is gradually decreased and its phase is simultaneously changed, as the distance "d" between the receiver and the pointing device is prolonged. This relation is represented by the following equation;

$$P = \sqrt{(R+j\omega L)(G+j\omega C)} = \alpha + j\beta \quad (1)$$

In the equation (1), R[Ω/m], L[H/m], C[F/m], and G[S/m]represent distributed constants of this loop coil, and depend on the material of loop coil. $\omega = 2\pi f$; f is frequency [Hz].

In the case shown in FIG. 22, the received signal V is represented by the following equation (2) according to the arithmetic operation of distributed constant circuit;

$$V = A \cdot \exp(-2\alpha d) \cdot \exp(-2j\beta d) \quad (2)$$

In the equation (2), "A" represents a constant including conversion constant during transmitting and receiving operation; "exp (−2αd)" represents the attenuated amount; "exp ((−2jβd)" represents the phase delayed amount; and "d" represents the distance between O and P. As is clear from the equation (2), the level and phase of the signal received by the receiver depend on the signal received position on the loop coil. The level will be attenuated and the phase will be delayed as the distance between the signal received position and the receiver is prolonged. FIG. 23(a) and 23(b) show graphical representations with respect to changes in the level and phase of the received signal by the receiver respectively. The data shown in FIG. 23(a) represents the result from the receiver positioned at the left end of the loop coil as well as FIG. 22. As the sensing area of a point detecting device is larger, the detected signal tends to be easily affected by the distance "d". Furthermore, since the distributed constant of one loop coil is not always equivalent to that of the other, the difference between two or more loop coil is naturally amplified in response to the distance "d". FIG. 23(a) and (b) show the amplitude difference by "ΔL". FIG. 23(b) shows an alternative case where the receiver is arranged at the right side of the loop coil. Thus the change in the level and phase of the received signal appears symmetrically as in the case of FIG. 23(a).

The same phenomenon appears when a signal is transmitted from the position O to make electromagnetic function with the pointing device at point P.

As discussed above, the level attenuation and phase delay depending on the distance between the pointing device and the signal transmitter or receiver, and the variation in the received or transmitted signal generated between two or more loop coils will result in arithmetic errors. These errors will be generated more markedly as the length of the loop coil extends.

Typically, a loop coil is manufactured by forming a loop shape conductive pattern on a substrate in a vacuum evaporation or printing manner. Ordinary sized point detecting devices employ loop coils made of copper or silver formed on a substrate by printing. However, such metal deposited loop coils provide relatively high impedance which result in too large a propagation constant to use normally. Therefore, large scaled point detecting devices employ loop coils made of aluminum providing a low impedance by means of vacuum evaporation. Such manufactured loop coils are or remarkably high cost.

BRIEF SUMMARY OF THE INVENTION

It is therefore an object of the present invention to provide an improved point detecting device for providing locational information such as coordinate information which is indicated by a pointing device which resolves detection errors owing to the level attenuation and phase delay caused in the signal transmitted or received through a long loop coil.

Another object of the present invention is to provide an improved point detecting device adapted for a large scaled system.

An additional object of the present invention is to provide an improved point detecting device with a relatively simple structure to resolve the above described detection errors.

A further object of the present invention is to provide an improved point detecting device with a means of preventing the ends of the loop coils from affecting the magnetic function.

A further object of the present invention is to provide an improved large scale point detecting device for realizing the above described objects at a low cost.

Furthermore, the object of the present invention is to provide a method for realizing the above described objectives.

To accomplish the above described objects, a point detecting device according to the present invention is characterized by the following compositions.

(1) A point detecting device including a point sensing area and a pointing device, capable of moving over the point sensing area, further comprises a plurality of electromagnetic coupling means arranged in parallel in a first axial direction within the point sensing area, a pair of signal receivers each of which is arranged at either end of a second axial direction of the electromagnetic coupling means intersected perpendicularly to the first axial direction so that the signal receiver can receive the signal generated by the electromagnetic function between the electromagnetic coupling means and the pointing device located above the electromagnetic coupling means; and a signal processor including an adder for adding the received signals by the receivers and means for arithmetically operating the coordinate values of the pointing device.

(2) In the point detecting device as set forth in (1), the electromagnetic coupling means comprises a pair of loop coils arranged closely with each other, each one of which is connected to either one of the receiver pair.

(3) The point detecting device as set forth in (1) further comprises a plurality of selecting switches arranged at both ends of the second axial direction of the electromagnetic coupling means for switching between one of the loop coil connected to one of the receiver and the other loop coil connected to the other receiver to establish the electromagnetic coupling means.

(4) A point detecting device including a point sensing area and a pointing device capable of moving over the point sensing area, further comprises a plurality of electromagnetic coupling means arranged in parallel in a first axial direction within the point sensing area, a pair of signal transmitters each of which is arranged at either end of a second axial direction of the electromagnetic coupling means intersected perpendicularly to the first axial direction so that the transmitter can transmit a signal to the electromagnetic coupling means; and a signal processor for processing the signal generated by the electromagnetic function between the transmitted signal pair and the pointing device to obtain the coordinate values of the pointing device.

(5) In the point detecting device as set forth in (4), the electromagnetic coupling means comprises a pair of loop coils arranged closely with each other, each one of which is connected to either one of the transmitter pair.

(6) The point detecting device as set forth in (4) further comprises a plurality of selecting switches arranged at both ends of the second axial direction of the electromagnetic coupling means for switching between one of the loop coils connected to one of the transmitters and the other loop coil connected to the other transmitter, to establish the electromagnetic coupling means.

(7) A point detecting device including a point sensing area and a pointing device capable of moving over the point sensing area, further comprises a plurality of electromagnetic coupling means arranged in parallel in a first axial direction within the point sensing area, a pair of signal transmitters each of which is arranged at either end of a second axial direction of the electromagnetic coupling means intersected perpendicularly to the first axial direction; a pair of signal receivers each of which is arranged at either end of the second axial direction of the electromagnetic coupling means intersected perpendicularly to the first axial direction so that the signal receiver can receive the signal generated by the electromagnetic function between the electromagnetic coupling means and the pointing device located above the electromagnetic coupling means; a selecting means for selecting either the transmitter and receiver arranged at one or other end of the electromagnetic coupling means; and a signal processor including an adder for adding the received signals and the receivers and means for operating arithmetically the coordinate values of the pointing device.

(8) In the point detecting device as set forth in (7), the electromagnetic coupling means comprises a pair of loop coils arranged close together, each one of which is connected toeither one of the transmitters and receivers through the selecting means.

(9) The point detecting device as set forth in (7) further comprises a plurality of selecting switches arranged at both ends of the second axial direction of the electromagnetic coupling means for switching between one of the loop coil connected to one of the transmitter or receiver and the other loop coil connected to the other transmitter or receiver to establish the electromagnetic coupling means.

(10) A point detecting device including a point sensing area and a pointing device capable of moving over the point sensing area, further comprises a plurality of first loop coil pairs, each pair of which includes two loop coils arranged close together, and pairs are arranged in parallel in a first axial direction within the point sensing area; a plurality of second loop coil pairs each pair of which includes two loop coils arranged closely with each other and which pairs are arranged in parallel in a second axial direction intersected perpendicularly to a first axial direction; a pair of signal transmitters each of which is arranged at either end of the second axial direction of the second loop coil pairs to transmit the signal towards the above portion with respect to each coil of the second loop coil pairs; a pair of signal receivers which are arranged at either end of the second axial direction of the first loop coil pairs to receive the signal generated by the electromagnetic function between the pointing device and each loop coil; and a signal processor including an adder for adding the received signal pair and the receiver pair and means for operating arithmetically the coordinate values of the pointing device.

(11) A point detecting device including a point sensing area and a pointing device capable of moving over the point sensing area, further comprises a plurality of loop coil pairs each pair of which includes two loop coils arranged close together and in which pairs are arranged in parallel in a first axial direction within the point sensing area; a plurality of loop coil pairs each pair of which includes two loop coils arranged closely with each other and which pairs are arranged in parallel in a second axial direction intersected perpendicularly to the first axial direction; a pair of signal transmitters each of which is arranged at either end of the second axial direction of the above described loop coil pair to transmit the signal towards the above portion with respect to each coil of the above described loop coil pair; a pair of signal receivers each of which is arranged at either end of the first axial direction of the above described loop coil pair to receive the signal generated by the electromagnetic function between the pointing device and each loop coil; and a signal processor including an adder for adding the received signal pair with the receiver pair and means for operating arithmetically the coordinate values of the pointing device.

(12) A point detecting device including a point sensing area and a pointing device capable of moving over the point sensing area, further comprises a plurality of loop coil pairs each pair of which includes two loop coils arranged close together and in which pairs are arranged in parallel in a first axial direction within the point sensing area; a plurality of loop coils arranged in parallel in a second axial direction intersected perpendicularly to the first axial direction; a signal transmitter arranged at one end of the first axial direction of the above described loop coil to transmit the signal towards the above portion with respect to the above described loop coil; a pair of signal receivers each of which is arranged at either end of the second axial direction of the above described loop coil pair to receive the signal generated by the electromagnetic function between the pointing device and each loop coil of the loop coil pair; and a signal processor including an adder for adding the received signal pair and the receiver pair and means for operating arithmetically the coordinate values of the pointing device.

(13) A point detecting device including a point sensing area and a pointing device capable of moving over the point sensing area, further comprises a plurality of electromagnetic coupling means arranged in parallel in a first axial direction within the point sensing area, a signal transmitter arranged at one end of a second axial direction of the electromagnetic coupling means intersected perpendicularly to the first axial direction; a signal receiver arranged at the other end of the second axial direction of the electromagnetic coupling means so that the signal receiver can receive the signal generated by the electromagnetic function between the electromagnetic coupling means and the pointing device located above the electromagnetic coupling means; and a signal processor for operating arithmetically the coordinate values of the pointing device.

(14) In the point detecting device as set forth in (13), the electromagnetic coupling means comprises a pair of loop coils arranged closely with each other; the signal transmitter transmits signal to one of loop coil of the loop coil pair; and the signal receiver receives signal from the other loop coil of the loop coil pair.

(15) The point detecting device as set forth in (13) further comprises a plurality of selecting switches arranged at both ends of the second axial direction of the electromagnetic coupling means for switching between one of the loop coil connected to the transmitter and the other loop coil connected to the receiver to establish the electromagnetic coupling means.

(16) A point detecting device including a point sensing area and a pointing device capable of moving over the point sensing area, further comprises first and second electromagnetic coupling means which are prevented from electromagnetic coupling with each other; a first amplifier which oscillates when a positive feedback loop is formed by the first amplifier, the pointing device, the above first electromagnetic coupling means, one end of which is connected to an input terminal, and the second electromagnetic coupling means one end of which is connected to an output terminal; a second amplifier which oscillates when a positive feedback loop is formed by the second amplifier, pointing device, the above first electromagnetic coupling means, the other end of which is connected to an input terminal, and the second electromagnetic coupling means the other end of which is connected to an output terminal; and a signal processor including an adder for adding the oscillated signal pair from the input terminals of the first and second amplifiers and means for operating arithmetically the coordinate values of the pointing device;

wherein the above described first electromagnetic coupling means includes a pair of loop coils arranged close together, one of which is connected to the input terminal of the first amplifier and the other loop coil is connected to the input terminal of the second amplifier; and the above described second electromagnetic coupling means includes a pair of loop coils arranged close together one of which is connected to the output terminal of the first amplifier and the other loop coil is connected to the output terminal of the second amplifier.

(17) A point detecting device including a point sensing area and a pointing device capable of moving over the point sensing area, further comprises first and second electromagnetic coupling means which are prevented from electromagnetic coupling with each other; an amplifier which oscillates when a positive feedback loop is formed by the amplifier, the pointing device, and the above first and second electromagnetic coupling means; an adding means for adding the signals from both ends of the first electromagnetic coupling means and inputting the added signal to the above described amplifier; an outputting means for outputting the output from the above described amplifier to both ends of the electromagnetic coupling means; and a signal processor for operating arithmetically the oscillated signal from the input terminal of the above described amplifier to provide the coordinate values of the pointing device;

wherein the above described first electromagnetic coupling means includes a pair of loop coils arranged close together, opposite ends of which are respectively connected to the input terminal of the above described adder; and the above described second electromagnetic coupling means includes a pair of loop coils arranged close together, opposite ends of which are respectively connected to the output terminal of the above described amplifier.

(18) A point detecting device including a point sensing area and a pointing device capable of moving over the point sensing area, further comprises first and second electromagnetic coupling means which are prevented from electromagnetic coupling with each other; an amplifier which oscillates when a positive feedback loop is formed by the amplifier, the pointing device, the above described first and second electromagnetic coupling means; a first switching means for selecting either signal from both ends of the first electromagnetic coupling means to input the selected signal to the above described amplifier; a second switching means for selecting either one of both ends of the second electromagnetic coupling means to output the signal from the above described amplifier; and a signal processor including an adding means for adding first and second oscillated signals through the input terminal of the above described amplifier and means for operating arithmetically the coordinate values of the pointing device, the first oscillated signal being fed to the adding means when the first switching means selects one end of the first electromagnetic coupling means and the second switching means selects one end of the second electromagnetic coupling means, and the second oscillated signal being fed to the adding means when the first switching means selects the other end of the first electromagnetic coupling means and the second switching means selects the other end of the second electromagnetic coupling means;

wherein the above described first electromagnetic coupling means includes a pair of loop coils arranged close together, opposite ends of which are respectively connected to the switching terminal of the above described first switching means; and the above described second electromagnetic coupling means includes a pair of loop coils arranged closely with each other, opposite ends of which are respectively connected to the switching terminal of the second switching means.

(19) A point detecting device including a point sensing area and a pointing device capable of moving over the point sensing area, further comprises first and second electromagnetic coupling means which are prevented from electromagnetic coupling with each other; an amplifier which oscillates when a positive feedback loop is formed by the amplifier, the pointing device, and the above first and second electromagnetic coupling means, one end of the second electromagnetic coupling means is connected to an output terminal of the amplifier; an adding means for adding the signals from both ends of the first electromagnetic coupling means and inputting the added signal to the above described amplifier; and a signal processor for operating arithmetically the oscillated signal from the input terminal of the above described amplifier to provide the coordinate values of the pointing device;

wherein the above described first electromagnetic coupling means includes a pair of loop coils arranged close together, opposite ends of which are respectively connected to the input terminal of the above described adder, and the above described second electromagnetic coupling means includes a loop coil.

(20) A point detecting device including a point sensing area and a pointing device capable of moving over the point sensing area, further comprises first and second electromagnetic coupling means which are prevented from electromagnetic coupling with each other; an amplifier which oscillates when a positive feedback loop is formed by the amplifier, the pointing device, and the above first and second electromagnetic coupling means, one end of the second electromagnetic coupling means is connected to an output terminal of the amplifier; a switching means for selecting either signal from both ends of the first electromagnetic coupling means to input the selected signal to the above described amplifier; and a signal processor including an adding means for adding first and second oscillated signals through the input terminal of the above described amplifier and means for operating arithmetically the coordinate values of the pointing device, the first oscillated signal being fed to the adding means when the switching means selects one end of the first electromagnetic coupling means and the second oscillated signal being fed to the adding means when the switching means selects the other end of the first electromagnetic coupling means;

wherein the above described first electromagnetic coupling means includes a pair of loop coils arranged closely with each other, opposite ends of which are respectively connected to the selecting terminal of the above described switching means; and the above described second electromagnetic coupling means includes a loop coil.

(21) A point detecting device including a point sensing area and a pointing device capable of moving over the point sensing area, further comprises first and second electromagnetic coupling means which are prevented from electromagnetic coupling with each other; a means which oscillates when a positive feedback loop is formed by the amplifier, the pointing device, and the above first and second electromagnetic coupling means, one end of the first electromagnetic coupling means is connected to an input terminal of the amplifier; an outputting means for outputting the output from the amplifier to both ends of the second electromagnetic coupling means; and a signal processor for operating arithmetically the oscillated signal from the input terminal of the above described amplifier to provide the coordinate values of the pointing device; wherein the above described first electromagnetic coupling means includes a loop coil; and the above described second electromagnetic coupling means includes a pair of loop coils arranged close together, opposite ends of which are respectively connected to the output terminal of the above described amplifier.

(22) A point detecting device including a point sensing area and a pointing device capable of moving over the point sensing area, further comprises first and second electromagnetic coupling means which are prevented from electromagnetic coupling with each other; an amplifier which oscillates when a positive feedback loop is formed by the amplifier, the pointing device, and the above first and second electromagnetic coupling means, one end of the first electromagnetic coupling means is connected to an input terminal of the amplifier; a switching means for selecting either end of the second electromagnetic coupling means to output the selected signal from the above described amplifier; and a signal processor including an adding means for adding first and second oscillated signals through the input terminal of the above described amplifier and means for operating arithmetically the coordinate values of the pointing device, the first oscillated signal being fed to the adding means when the switching means selects one end of the second electromagnetic coupling means and the second oscillated signal being fed to the adding means when the switching means selects the other end of the second electromagnetic coupling means; wherein the above described first electromagnetic coupling means includes a loop coil; and the above described second electromagnetic coupling means includes a pair of loop coils arranged close together, opposite ends of which are respectively connected to the switching terminal of the above described switching means.

(23) In the point detecting device as set forth in any one of (1), (2), (7), (8), (10), (12), (17) and (18), the above described electromagnetic coupling means includes a pair of loop coils arranged close to each other and having a reverse winding direction to each other, or a loop coil which is switched between the reverse winding direction by a switching means; the above described received signals of the pair are reversed with each other; and the above described adding means is a differential amplifier to which the above described signal pair is inputted as two input signals.

(24) In the point detecting device as set forth in any one of (3), (6), or (9), the above described one transmitter and the other transmitter form a common transmitter having respective transmission lines to both ends of the above described electromagnetic coupling means. Alternately, the above described one receiver and the other receiver form a common receiver having respective transmission lines from both ends of the above described electromagnetic coupling means.

(25) In a point detecting device which detects and processes the signal generated by electromagnetic function between a pointing device and a plurality of electromagnetic coupling means arranged in the point detecting direction so as to obtain the coordinate values of the pointing device; one of the above described electromagnetic coupling means includes a pair of loop coils arranged closely with each other, each one of which has at least one connection end for transmitting or receiving the signal and at least one turning end, or a loop coil having a switching means to switch the positions of the connection end and the turning end; and the point detecting device further comprises a decision means for deciding the substantial position of the pointing device according to the detected signal generated in transmitting or receiving mode which employs both loop coils of the above described loop coil pair or both switching positions of the above switching means, or according to the detected position of at least one of the cross loop coils arranged perpendicularly to the loop coil pair or the single loop coil, which are selectively used for transmitting or receiving signal; and receiving means or transmitting means, when the pointing device is located above the region including one loop coil of the above described loop coil pair or at least the turning end of one switching position, the above receiving means receiving at least one of the signals generated by the other loop coil or the other switching position, and the above transmitting means transmitting an actuating signal to generate the signal by the other loop coil or the other switching position.

(26) In the point detecting device as set forth in (25), the above described region including at least the turning end is defined from the centre of the above described electromagnetic coupling means to the above described turning end.

(27) In the point detecting device as set forth in any one of the preceding (1) to (26), the above described electromagnetic coupling means includes at least one of the loop coils and the turning end of each loop coil is provided on the substrate.

(28) In the point detecting device as set forth in any one of the preceding (1) to (27), the above described electromagnetic coupling means includes at least one of the loop coils and the turning end of each loop coil is covered with or arranged nearby effective magnetic shielding material or grounded conductive material.

(29) A point detecting method employing a point sensing area and a pointing device capable of moving over the point sensing area, further comprises steps for providing a plurality of electromagnetic coupling means arranged in parallel in a first axial direction within the point sensing area; receiving alternately or simultaneously signals generated by the electromagnetic function between the electromagnetic coupling means and the pointing device located above the electromagnetic coupling means, at both or either end of a second axial direction of the electromagnetic coupling means intersected perpendicularly to the first axial direction; and performing a signal processing step including an adding operation for adding the received signal pair for arithmetically operating the coordinate values of the pointing device.

(30) A point detecting method employing a point sensing area and a pointing device capable of moving over the point sensing area further comprises steps for: providing a plurality of electromagnetic coupling means arranged in parallel in a first axial direction within the point sensing area; transmitting alternately or simultaneously a pair of signals to the above space of the electromagnetic coupling means from both ends of a second axial direction of the electromagnetic coupling means intersected perpendicularly to the first axial direction; and processing the signals generated by the electromagnetic function between the pointing device and the transmitted signal pairs to arithmetically operate the coordinate values of the pointing device.

(31) A point detecting method employing a point sensing area and a pointing device capable of moving over the point sensing area further comprises steps for: providing a plurality of electromagnetic coupling means arranged in parallel in a first axial direction within the point sensing area; simultaneously transmitting and simultaneously receiving signals to the above space of the electromagnetic coupling means from both ends of a second axial direction of the electromagnetic coupling means intersected perpendicularly to the first axial direction, or transmitting and receiving a signal from one end of the above described both ends of the second axial direction of the electromagnetic coupling means and then transmitting and receiving another signal from the other end of the above described both ends so as to receive the signals generated by the electromagnetic function between the electromagnetic coupling means and the pointing device located above the electromagnetic coupling means; and performing a signal processing step including an adding operation for adding the received signal pair for arithmetically operating the coordinate values of the pointing device.

(32) A point detecting method employing a point sensing area and a pointing device capable of moving over the point sensing area further comprises: steps for providing a plurality of electromagnetic coupling means arranged in parallel in a first axial direction within the point sensing area; transmitting a signal to the above space of the electromagnetic coupling means from one end of a second axial direction of the electromagnetic coupling means intersected perpendicularly to the first axial direction; receiving the signal generated by the electromagnetic function between the pointing device and the electromagnetic coupling means; and processing the received signal to arithmetically operate the coordinate values of the pointing device.

(33) A point detecting method employing a point sensing area and a pointing device capable of moving over the point sensing area further comprises steps for: providing a plurality of first electromagnetic coupling means arranged in parallel in a first axial direction within the point sensing area; providing a plurality of second electromagnetic coupling means arranged in parallel in a second axial direction intersected perpendicularly to the first axial direction; simultaneously transmitting a pair of signals to the above space of the electromagnetic coupling means from both ends of the first axial direction of the second electromagnetic coupling means; simultaneously receiving the signal pair generated by the electromagnetic function between the pointing device and the electromagnetic coupling means at both ends of the second axial direction of the first electromagnetic coupling means; and performing a signal processing step including an adding operation for adding the received signal pair for arithmetically operating the coordinate values of the pointing device.

(34) A point detecting method employing a point sensing area and a pointing device capable of moving over the point sensing area further comprises steps for: providing a plurality of first electromagnetic coupling means arranged in parallel in a first axial direction within the point sensing area; providing a plurality of second electromagnetic coupling means arranged in parallel in a second axial direction intersected perpendicularly to the first axial direction; transmitting a signal to the above space of the electromagnetic coupling means from one of both ends of the first axial direction of the second electromagnetic coupling means; simultaneously receiving the signal generated by the electromagnetic function between the pointing device and the electromagnetic coupling means at both ends of the second axial direction of the first electromagnetic coupling means; and performing a signal processing step including an adding operation for adding the received signal pair for arithmetically operating the coordinate values of the pointing device.

(35) A point detecting method employing a point sensing area and a pointing device capable of moving over the point sensing area further comprises steps for: providing first and second electromagnetic coupling means which are prevented from electromagnetic coupling with each other; connecting an input terminal of a first amplifier to one end of the above first electromagnetic coupling means; connecting an output terminal of the first amplifier to one end of the above second electromagnetic coupling means; oscillating the first amplifier when a positive feedback loop is formed by the first amplifier, the pointing device, and the above described first and second electromagnetic coupling means; connecting an input terminal of a second amplifier to the other end of the above first electromagnetic coupling means; connecting an output terminal of the second amplifier to the other end of the above second electromagnetic coupling means; oscillating the second amplifier when a positive feedback loop is formed by the second amplifier, the pointing device, and the above described first and second electromagnetic coupling means; and performing a signal processing step including an adding operation for adding the oscillated signal pair from the input terminals of the first and second amplifiers for arithmetically operating the coordinate values of the pointing device signal.

(36) A point detecting method employing a point sensing area and a pointing device capable of moving over the point sensing area further comprises steps for: providing first and second electromagnetic coupling means which are prevented from electromagnetic coupling with each other; connecting an input terminal of an amplifier to both ends of the first electromagnetic coupling means through an adder and an output terminal of the amplifier to both ends of the second electromagnetic coupling means; oscillating the amplifier when a positive feedback loop is formed by the amplifier, the pointing device, and the above described first and second electromagnetic coupling means; and processing the oscillated signal from the input terminal of the above described amplifier to arithmetically operate the coordinate values of the pointing device.

(37) A point detecting method which detects and processes the signal generated by electromagnetic function between a pointing device and a plurality of electromagnetic coupling means arranged in the point detecting direction so as to obtain the coordinate values of the pointing device, further comprises steps for providing one of the above described electromagnetic coupling means which includes a pair of loop coils arranged closely with each other each one of which has at least one connection end for transmitting or receiving the signal and at least one turning end, or a loop coil having a switching means to switch the positions of the connection end and the turning end; when the pointing device is located above the region including one loop coil of the above described loop coil pair or at least the turning end of one switching position, receiving at least one of signals generated by the other loop coil or the other switching position, or transmitting an actuating signal to generate the signal by the other loop coil or the other switching position.

(38) In the point detecting method as set forth in (37), the above described region including at least the turning end is defined from the centre of the above described electromagnetic coupling means to the above described turning end.

Typical operations of the point detecting devices defined by the above described features will be described briefly as follows. The point detecting device according to the above described feature (1) comprises a plurality of electromagnetic coupling means arranged in the first axial direction corresponding to the point detecting direction in the point sensing area. Each of the electromagnetic coupling means includes a pair of receivers arranged at either ends of the second axial direction intersected perpendicularly to the first axial direction. The receivers at either ends of the second axial direction receive the signal generated by the electromagnetic function between the pointing device and the electromagnetic coupling means. The coordinate value in the first axial direction can be arithmetically obtained according to the received signals. However, thus received signal pair include respective errors based on lowering of level and delayed phase owing to the propagation constant of the electromagnetic coupling means used. A characteristics of the errors included in the detected signal pair in the second axial direction of the electromagnetic coupling means is that they are symmetric with each other with respect to the centre of the electromagnetic coupling means. Therefore, the errors included in the level and phase are cancelled by adding the signal pair regardless of the position on the electromagnetic coupling means.

In the point detecting device according to the above described feature (4) transmitting signals from both ends of the electromagnetic coupling means, the characteristics of the errors based on lowering of level and delayed phase owing to the propagation constant included in the transmitted signal pair are also symmetric with each other with respect to the centre of the electromagnetic coupling means. Accordingly, when the signal pair is simultaneously transmitted from both ends of the electromagnetic coupling means, the signal pair are overlapped at any position on the electromagnetic coupling means so that the errors based on lowering of level and delayed phase will be cancelled. After this cancellation, an electromagnetic function will be generated between the transmitted signal pairs and the pointing device. In the case of alternately transmitting signals, after receiving the received signal pair is added to substantially cancel the errors relating to level and phase. This case can also provide the coordinate value in the first axial direction.

The adding operation or adding effect on the received signal pair which resulted in the above described feature (1) and the transmitted signal pair resulted in the above described feature (4) will be also exhibited in the above described feature (7) which provides transmitting and receiving operations at both ends of the electromagnetic coupling means. The case (7) can provide the coordinate value in the first axial direction.

In the point detecting devices according to the above described features (10) to (12), providing the cross type detecting operation which transmit a signal towards the pointing device from one axial direction and receive the signal generated by the electromagnetic function between the transmitted signal and the pointing device at the other axial direction, the above described error cancellation will also be exhibited in the transmitted and received signals of the above described feature (10), the received signal of the above described feature (11) and the transmitted signal of the above described feature (12).

In the point detecting devices according to the above described features (13) to (15) which transmit a signal from one end of the electromagnetic coupling means arranged in the second axial direction and receive the signal generated by the electromagnetic function between the transmitted signal and the pointing device at the other end of the electromagnetic coupling means, a characteristics of the errors included in the transmitted signal owing to the propagation constant is that it is symmetrical with that of the received signal with respect to the centre of the electromagnetic coupling means. Therefore, the errors included in the level and phase generated in the transmitted and received signals are cancelled. These cases can also provide the coordinate value in the first axial direction.

In the point detecting devices according to the above described features (16) to (22) which provide an oscillating signal when a positive feedback loop, an oscillating mechanism, is formed by a pointing device, two electromagnetic coupling means and an amplifier, the oscillated signal is detected from both ends of the electromagnetic coupling means and then processed by an adding operation to cancel the errors of the level and phase owing to the propagation constant.

In the above described point detecting devices, when the transmitting, receiving, transmitting and receiving, or oscillating operation are simultaneously performed at both ends of the electromagnetic coupling means, the point detecting operation can be performed at a high speed.

In the above described point detecting devices, when the transmitting, receiving, transmitting and receiving, or oscillating operation is alternately performed at each end of the electromagnetic coupling means, the electromagnetic coupling means can be simplified.

In the point detecting device according to the above described feature (23), the received signals at either end of the electromagnetic coupling means are reversed with each other, and these reverse signals include the same phase noise. These signals are respectively inputted to two input terminals of the differential amplifier so that the difference between these reverse signals; i.e., the value added by the absolute values of these reverse signals, is produced as an output signal, eliminating the same phase noise.

In the point detecting device according to the above described feature (24), when the transmitting, receiving, or oscillating operation is alternately performed at both ends, or the loop coils are selectively used, a single amplifier for the transmitter, receiver or oscillating mechanism is arranged at either one of both ends of the electromagnetic coupling means and thus the amplifier is switched to perform these operations. This allows the circuit to be simple.

In the point detecting device according to the above described features (25) and (26), the electromagnetic coupling means comprises a pair of loop coils or a loop coil capable of switching between two different connecting states, and each loop coil has a turning end. When a pointing device is located near the turning end of one of the loop coils, the other loop coil is used or the connection is switched to the alternative state so as to use the signal above the other loop coil. This switching operation can eliminate the errors caused by the electromagnetic function of the turning end of the loop coil.

In the point detecting device according to the above described features (27) and (28), the loop coil of the electromagnetic coupling means includes a turning end which is arranged on a substrate or covered with any suitable material having a magnetic shielding effect. This configuration can prevent the generation of errors owing to the magnetic function or eliminate noises from the detected signal.

Other objects, features and advantages of the invention will be apparent from the following description taken in connection with the accompanying drawings.

BRIEF DESCRIPTION OF THE DRAWING

FIG. 8 is a schematic illustration which shows modified configurations of the loop coil adapted for alternately transmitting or receiving operation;

FIG. 10 is a schematic illustration which shows various configurations of the cross type detecting device according to the present invention;

FIG. 15 is a schematic illustration for explaining the improvement in the method for overlapping loop coil pair;

DETAILED DESCRIPTION OF THE PREFERRED EMBODIMENT

Figure 1:
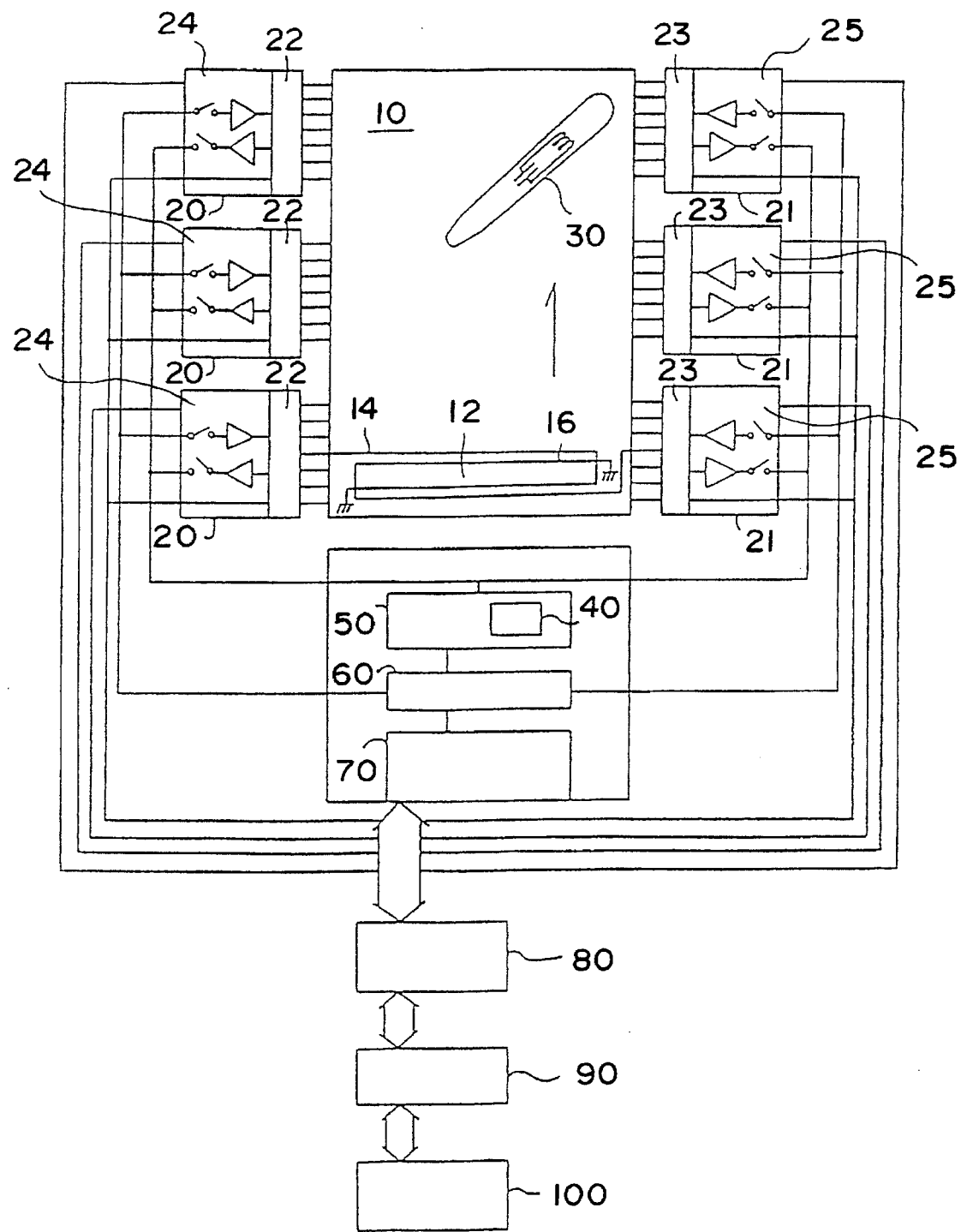
FIG. 1 is a block diagram which shows one example of overall configuration of the point detecting device according to the first embodiment of the present invention.

The present invention will be understood by discussing on some preferred embodiments in conjunction with the accompanying drawings. FIG. 1 shows one example of overall configuration of the point detecting device according to the first embodiment of the present invention. In the drawing, the reference numeral 10 denotes a sensor unit of the point detecting device. At both sides of the sensor panel 10, a plurality of left and right side boards 22 and 23 are arranged, respectively. Each one of the side boards 20 (21) further includes a loop coil switching unit 22 (23) and a signal transmitting and receiving unit 24 (25). Additionally, this point detecting device is associated with a pointing device 30, an adder 40, a signal detecting unit 50, a signal generator 60, a control unit 70, a signal processor 80, an interface unit 90, and a host computer 100.

The sensor panel 10 further includes a plurality of loop coil pairs 12. The loop coils of each pair are arranged closely and the pairs are arranged in parallel with each other in the point sensing direction represented by the arrow in FIG. 1.

Figure 2:
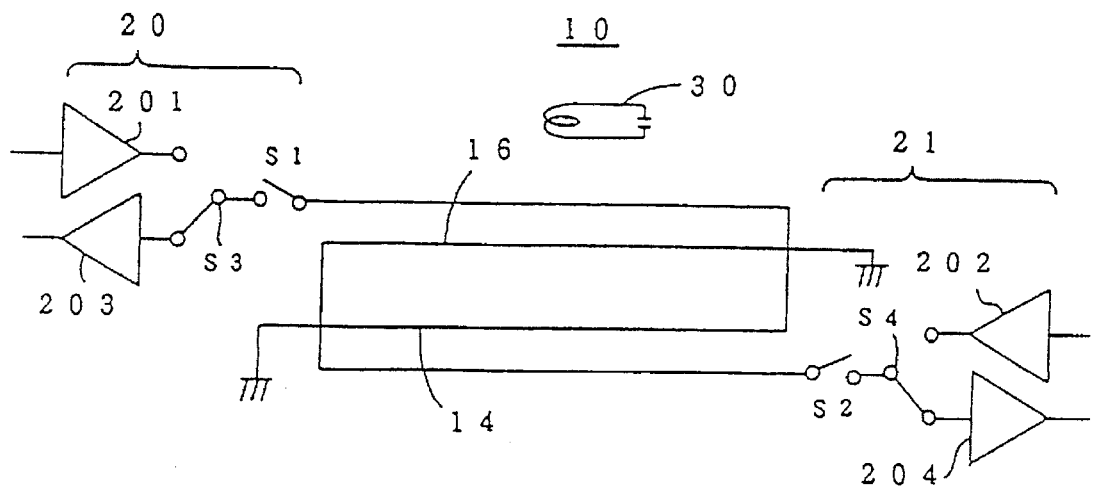
FIG. 2 is a schematic illustration which shows a pair of loop coils and their associated signal transmitting and receiving units arranged at respective ends of the loop coil pair according to the present invention.

FIG. 2 shows one loop coil pair 12 and its associated side boards 20 and 21. The loop coil pair 12 is composed of two loop coils 14 and 16 which are arranged symmetrically with respect to the central axis of the sensor panel 10. Although FIG. 2 shows these two loop coils 14 and 16 separated from each other, they are actually intimately closed as well as overlapped. The other loop coil pairs are configured in the same manner as this. The side boards 20 and 21 include switches S1 and S2 for the loop coil switching units 22 and 23 to select either the loop coil 14 or 16, respectively. The side boards 20 and 21 further include switches S3 and S4 for the signal transmitting and receiving units 24 and 25 to select either their transmitter or receiver, respectively. That is, the loop coil 14, one of the loop coil pair 12, is selectively connected to either transmitter 201 or receiver 203 of the signal transmitting and receiving unit 24 by means of the switch S3 while the switch S1 is closed. Also, the other loop coil 16 is selectively connected to either transmitter 202 or receiver 204 of the signal transmitting and receiving unit 25 by means of the switch S4 while the switch S2 is closed.

The sensor panel 10 is made of a flexible substrate on which a plurality of loop shape pattern of conductive material are formed in a vacuum evaporation or printing manner. The loop coil pairs are formed in parallel in the X-axial direction and the Y-axial direction intersected perpendicularly with each other to detect coordinate values of the pointed location on the two axial directions.

The transmitters 201 and 202 transmit the signal fed from the signal generator 60 to the loop coils 14 and 16, respectively. The receivers 203 and 204 receive the signal from the loop coils 14 and 16, and transmit the received signal to the signal detecting unit 50.

The above described switching operation of the loop coil switching units 22 and 23, and signal feeding operation between the signal generator 60 and the signal detecting unit 50 are controlled by the control unit 70 in response to the command signal from the signal processor 80.

The pointing device 30 is a cursor or pointing pen whose casing includes a tuning circuit composed of a coil, a capacitor and a switch, as an example. The coil and capacitor constitute a resonant circuit having a specific resonant frequency. A typically used cursor is constituted to vary the capacitance of the resonant circuit by pressing the switch. On the other hand, a typical pointing pen is constituted to vary the capacitance of the resonant circuit by turning on the switch when the pointing device 30 is pressed onto the sensor panel 10. The capacitance of the resonant circuit is varied so that the resonant frequency of the circuit is lowered.

The signal generator 60 generates an AC signal having any required frequency and phase by combination of random access memory (RAM) storing AC signal data, digital-analog (DA) convertor, and low pass filter (LPF), and then outputs the generated signal.

The signal detecting unit 50 processes the received signal to produce the values of the real number part and imaginary number part of the intended frequency component of the received signal, and then operates arithmetically the amplitude and phase angle of the frequency component according to the produced values. The processing method of the received signal has been well known as Analog Phase Detection disclosed in Japanese Patent Publication No. 2-53805/1990 or Digital Fourier Transform disclosed in Japanese Patent Publication No. 3-147012/1991.

The adder 40 included in the signal detecting unit 50 performs an add operation on the signals from the loop coils 14 and 16. This addition cancels the errors in the level and phase of the received signals. The operation and structure of the adder 40 will be described later in detail.

The control unit 70 is activated in response to the command signal from the signal processor 80 to control the timing of respective units in predetermined sequences.

The interface unit 90 is arranged to communicate data between the signal processor 80 and the host computer 100. The interface unit 90 includes at least two FIFO type registers directly connected to the bus line of the host computer 100 which accesses the register to read the data from the processor 80.

The processor 80 performs arithmetic operations and the other various operations such as communication with the host computer and general controls on the units of the detecting device. In detail, the processor 80 performs arithmetic operations to obtain the coordinate values of the pointing device 30 in response to the information on amplitude and phase angle transmitted from the signal detecting unit 50, and decides the switching condition of the pointing device 30.

A typical operation sequence of the detecting device according to the present invention will be briefly described.

Firstly, the processor 80 transmits a command signal to the signal generator 60 to generate a sinusoidal wave with a predetermined frequency f0 for example 500 kHz for 32 μsec, and a switching signal to the control unit 70 to select the loop coil pair. Then the control unit 70 allows the switching operation of the loop coil switching units 22 and 23, and the signal (electromagnetic wave) transmitting and receiving operation of the signal transmitting and receiving units 24 and 25. After this operation, the signal detecting unit 50 performs the predetermined operation on the received signal including the add operation, and transmits the data representing the amplitude and phase angle of the 500 kHz component of the received signal to the signal processor 80. The loop coil pairs are successively switched one by one and the above described operation sequence is repeated on the switched loop coil pair to form the pattern of resultant amplitude data. The processor 80 decides which loop coil pair is pointed by the pointing device 30 by referring to the pattern, and then performs the arithmetic operation to provide the coordinate value of the location of the pointing device 30. This result and the phase data are transmitted to the interface unit 90.

Figure 3:
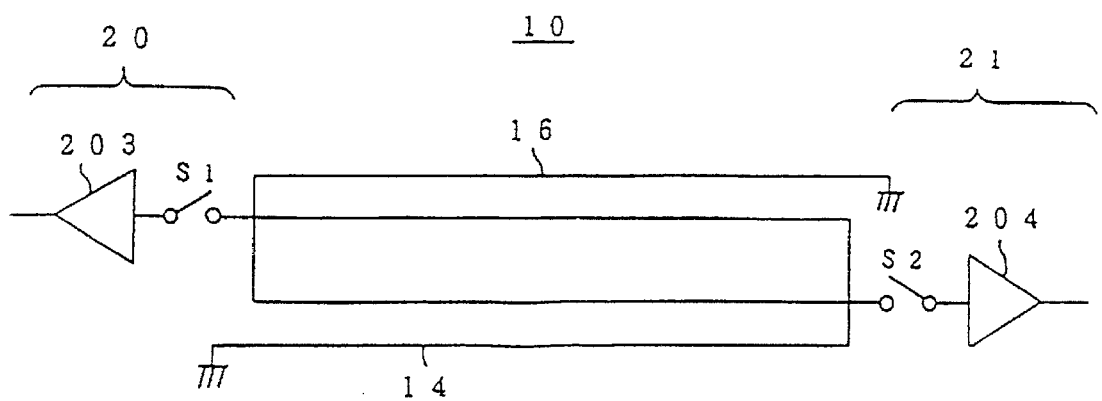
FIG. 3 is a schematic illustration which shows only the receivers arranged at both ends of the loop coil according to the present invention.

One typical example of the add operation performed in the adder 40 of the signal detecting unit 50 will be described in detail in conjunction with FIG. 1 and FIG. 3. For easier understanding, FIG. 3 shows only the receivers at both ends of the loop coil pair. In this configuration, the transmitter is included in the pointing device and the signal processing operations are performed in the same manner as FIG. 2.

Figure 5:
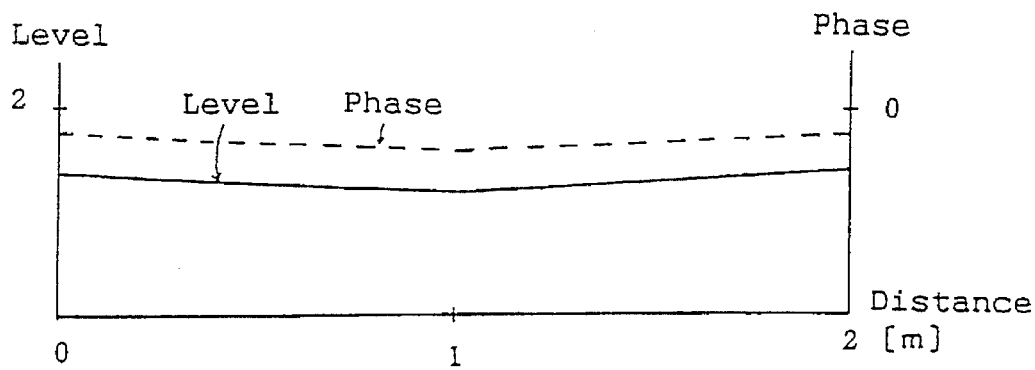
FIG. 5 is a graph representation showing characteristic curves of the level and phase of the received signals from the loop coils configured in FIG. 2.
Figure 23A:
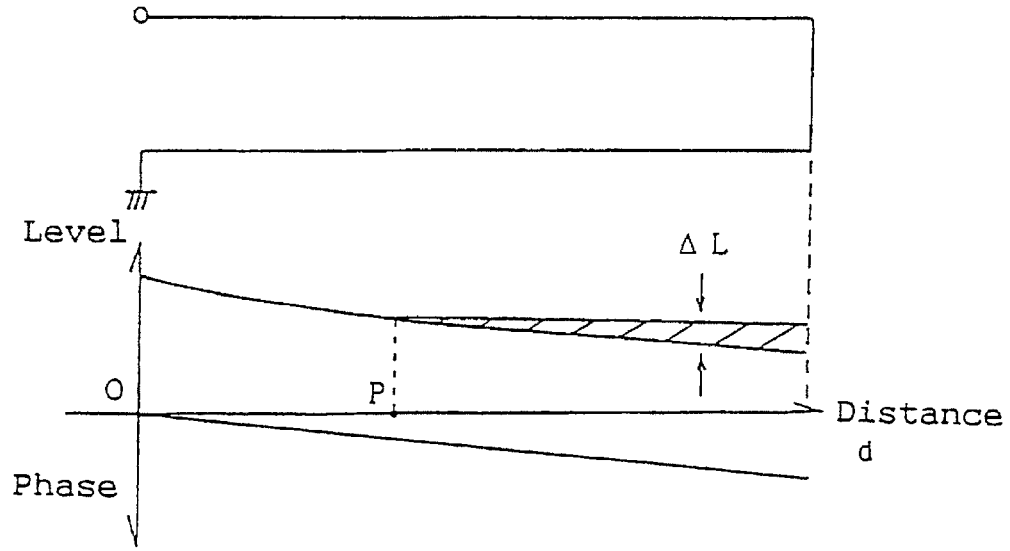
FIG. 23 is a graphical representation showing characteristic curves of the level and phase of the received signals from the conventional loop coil arrangement.
Figure 23B:
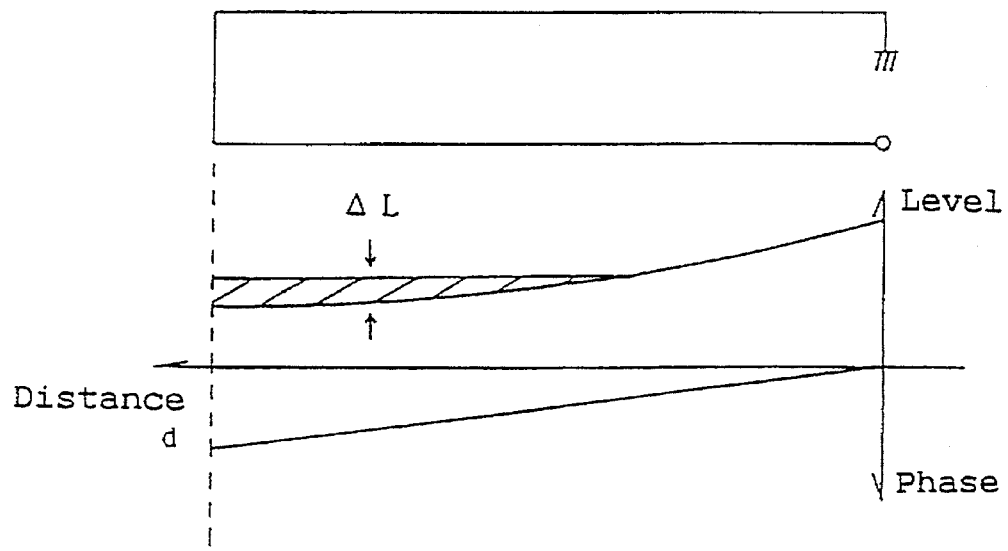

FIG. 5 is a graph representation for explaining the add operation of the received signals from the loop coils 14 and 16 configured in FIG. 3. In FIG. 5, the horizontal axis represents the distance between one end of the loop coil pair and the pointing device, and the vertical axis represents the level (any desired unit) and phase of the signals generated by the electromagnetic function. These data are resulted from the add operation on the received signals produced by the equation (2). FIG. 23 described before shows that the signal level is lowered and phase is delayed as the distance between the signal receiver and the pointing device, while FIG. 5 shows that the add operation can provide the received signal having a substantially equivalent level and phase regardless of the distance. The curves shown in FIG. 5 rise slightly at both ends and are symmetrical with respect to the centre of the loop coil pair.

Figure 4:
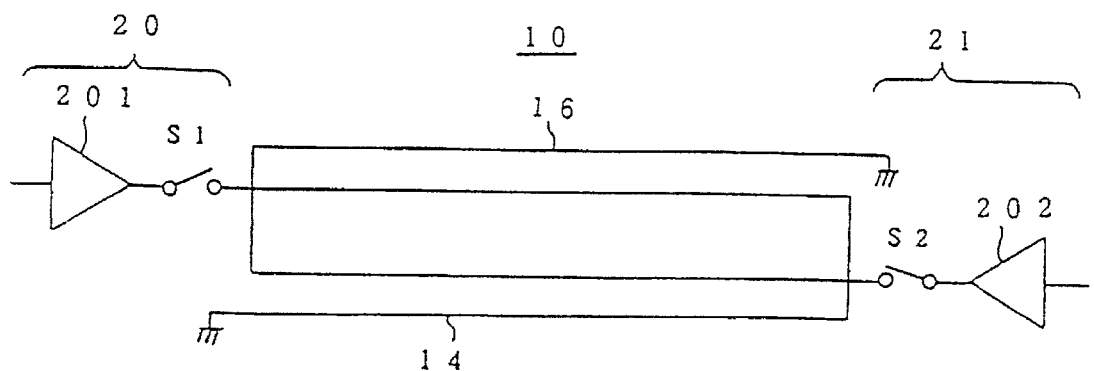
FIG. 4 is a schematic illustration which shows only the transmitters arranged at both ends of the loop coil according to the present invention.

In the embodiments according to the present invention, the propagation constant of the lines between the signal generator 60 and the transmitter or receiver is corrected by previous calibration, so that the propagation constant can be ignored. FIG. 4 is a schematic illustration which shows only the transmitters arranged at both ends of the loop coil pair. In this configuration, the receiver is included in the pointing device. When the transmitters at both ends transmit signals to respective loop coils on the same occasion, the signal level and phase resulting from this configuration are represented substantially the same as FIG. 5 through the add operation on the signals from both ends. Accordingly, the pointing device can generate an electromagnetic function with the transmitted signal having an equivalent level and phase regardless of the location on the loop coil pair.

Since the configuration shown in FIG. 2 is combined by the configurations shown in FIG. 3 and FIG. 4, the received signal through the add operation has the same qualitative characteristics as FIG. 5.

Figure 6:
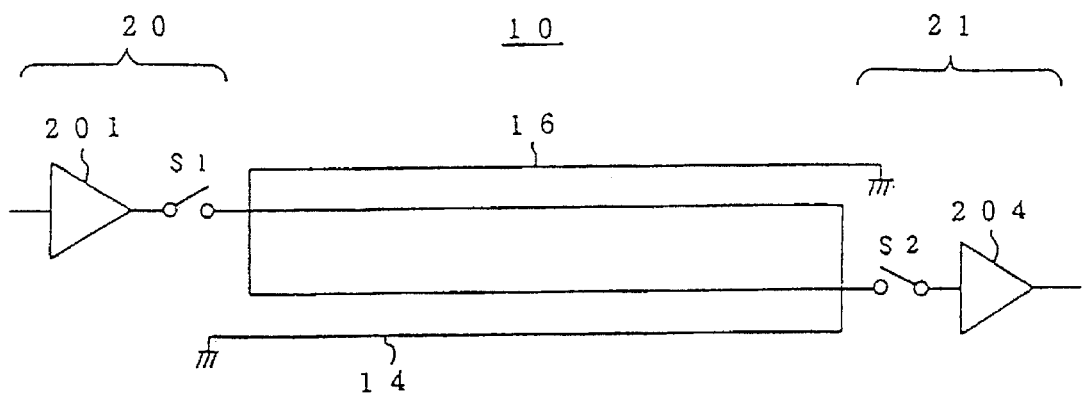
FIG. 6 is a schematic illustration which shows one transmitter arranged at one end of the loop coil configuration and one receiver arranged at the other end according to the present invention.
Figure 7:
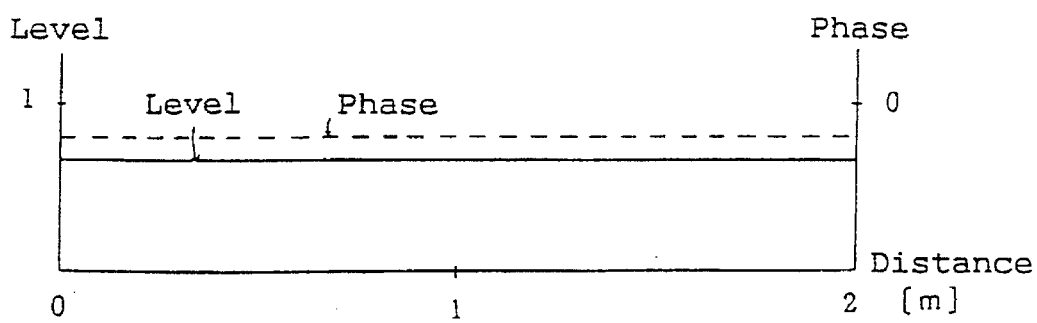
FIG. 7 is a graph representation showing characteristic curves of the level and phase of the received signals from the loop coils configured in FIG. 6.

FIG. 6 is a schematic illustration which shows one example of constitution to provide a constant received signal without using the adder. In this configuration, a transmitter arranged at one end of one loop coil 14 transmits a signal to the pointing device, and a receiver arranged at the opposite end of the other loop coil 16 receives the signal generated by the electromagnetic function between the pointing device and the transmitted signal. FIG. 7 shows characteristic curves of the level and phase of the received signals from this configuration. This results in a signal with constant level and phase regardless of the distance.

Figure 22:
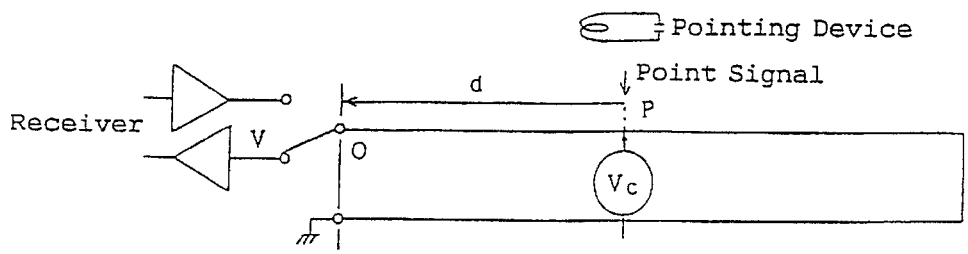
FIG. 22 is a schematic illustration of a typical, conventional arrangement of loop coil and transmitter and receiver.

Table 1 shows the data of the signal level and phase resulting from the conventional configuration shown in FIG. 22 (items 1 and 2) and the various configurations shown in FIG. 2 (items 3 and 4), FIG. 3 and FIG. 4 (items 5 and 6), and FIG. 6 (items 7 and 8) when two pattern types made of a commonly used metal (silver or copper) and Al are used. In order to compare, the value of the signal level shown in the items 3, 4, 5 and 6 using the add operation is represented ½ and the value at the distance 0 m of the conventional examples items 1 and 2 is given as 1. The former is the relative value to the later value 1. The value inside the parentheses represents the phase which is relatively advanced or delayed from the value, given as 0 degree, at 0 m of the conventional configuration.

Table 1

The relation of the signal level and phase with respect to the distance between the pointing device and the receiver or transmitter. The value inside parentheses represents the phase whose unit is the degree of an angle.

TABLE 1

The relation of the signal level and phase with respect to the distance between the pointing device and the receiver or transmitter. The value inside parentheses represents the phase whose unit is the degree of an angle.

| Constitution | Distance (m) 0 | 1 | 2 |
| --- | --- | --- | --- |
| 1. Metal | 1 (0) | 0.92 (−5.2) | 0.84 (−10.4) |
| 2. Al | 1 (0) | 0.98 (−2.1) | 0.96 (−4.1) |
| 3. Metal | 0.92 + $\Delta V1$ (−5.0) | 0.92 (−5.2) | 0.92 + $\Delta V1$ (−5.0) |
| 4. Al | 0.98 + $\Delta V1$ (−2.08) | 0.98 (−2.1) | 0.98 + $\Delta V1$ (−2.08) |
| 5. Metal | 0.96 + $\Delta V2$ (−2.5) | 0.96 (−2.6) | 0.96 + $\Delta V2$ (−2.5) |
| 6. Al | 0.99 + $\Delta V2$ (−0.09) | 0.99 (−1.0) | 0.99 + $\Delta V2$ (−0.09) |
| 7. Metal | 0.92 (−5.2) | 0.92 (−5.2) | 0.92 (−5.2) |
| 8. Al | 0.98 (−5.2) | 0.98 (−5.2) | 0.98 (−5.2) |

($\Delta V1 = -2 \times 10 - 4$,
$\Delta V2 = -1 \times 10 - 4$)

The constitutions of the above described items are as follows. 1 and 2: Conventional Example; 3 and 4: Transmitter and Receiver at both ends; 5 and 6: Transmitters at both ends or Receivers at both ends; 7 and 8: Transmitter at one end and Receiver at the other end.

The conventional configuration (items 1 and 2) show that the level and phase are varied simply as the distance is increased. Particularly, the level and phase of the metal pattern sample (item 1) is remarkably varied at the distance 2 m. On the other hand, the configurations according to the present invention (items 3 to 8) can provide the equivalent or substantially equivalent level and phase regardless of the distance. It is particularly noted that the configurations using the metal pattern (items 3, 5 and 7) according to the present invention can provide an almost equivalent level and phase regardless of the distance. This effect allows the use of a low cost metal pattern for a large sized point detecting device.

In the examples shown FIG. 2 and FIG. 4, the signals can be transmitted from the transmitters at both ends on the same occasion or alternately transmitted to respective loop coils one by one. In the case of alternately transmitting, the same effect as the simultaneously transmitting operation can be achieved if a pair of received signals corresponding to the transmitted signals are added by the adder. In the case of the configuration shown in FIG. 3, when the transmitter at the pointing device transmits a signal twice to receive the signals alternately by the respective loop coils, the received signal pair may be subjected to the add operation by the adder. This alternately transmitting or receiving operation can simplify the circuit and/or loop coil.

In the above described configurations according to the present invention, the add operation can cancel the variations in the signal level to some degree. Since the variations in the signal level depend on the distance, the variation generated at shorter distance and that at longer distance are added together to provide the average level regardless of the distance.

FIG. 8 is a schematic illustration which shows modified and simplified configurations of the loop coil adapted for alternately transmitting or receiving operation. The configuration shown in FIG. 8(a) and (a') corresponds to FIG. 2. In the shown condition of (a), a switch S1 is switched to perform signal transmitting and receiving operation alternately at the left end of the loop coil. Then the switch S1 and a switch S2 are closed and a switch S3 is connected to ground. Furthermore, a switch S4 is opened to perform signal transmitting and receiving operation alternately at the right end of the loop coil. The constitution of (a') is modification of (a) whose returning line is commonly used when the loop coils are arranged in parallel. In this constitution a'), the transmitted and received signals of one end are reversed to the signals of the other end.

The configuration shown in FIG. 8 (b) and (b') corresponds to FIG. 3. In (b), the shown condition performs to receive the signal at the left end. Then, switches S1 to S4 are switched to perform signal receiving operation at the right end of the loop coil. The constitution of (b') is modified of (b) whose returning line is commonly used when the loop coils are arranged in parallel. In this constitution (b'), the received signals of one end are reversed with the signals of the other end.

The configuration shown in FIG. 8(c) and (c') corresponds to FIG. 4. In (c), the shown condition performs to transmit the signal at the left end. Then, switches S1 to S4 are switched to perform signal transmitting operaloop at the right end of the loop coil. The constitution of (c') is modification of (c) whose returning line is commonly used when the loop coils are arranged in parallel. In this constitution (c'), the received signals of one end are reversed with the signals of the other end. In the above configurations, it is possible to start the signal receiving or transmitting operation at either end as required.

The configuration shown in FIG. 8(d) corresponds to FIG. 6 which performs signal transmitting operation at one end and signal receiving operation at the other end.

Figure 9:
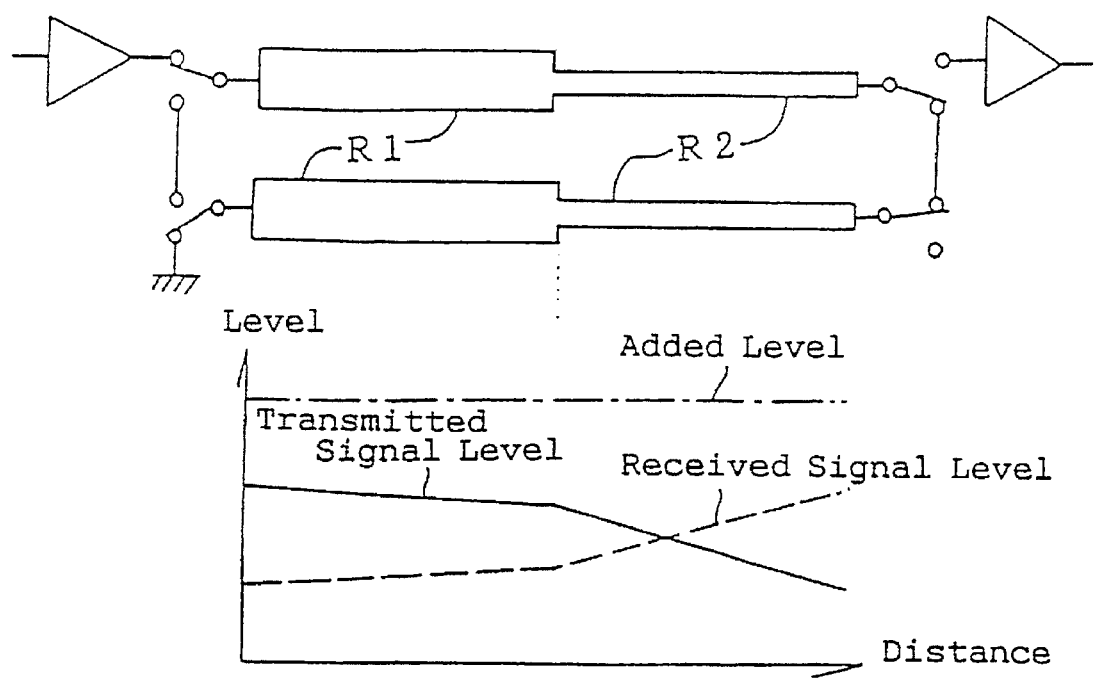
FIG. 9 is a schematic illustration and graphical representation explaining the cancel effect on the irregularity of impedance generated in the loop coil.
Figure 11A:
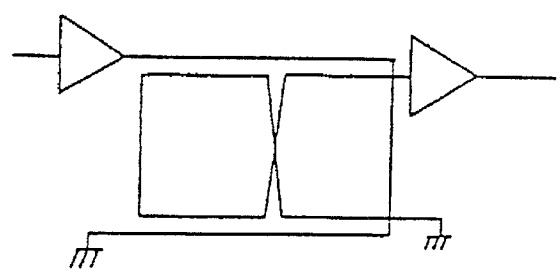
FIG. 11 is a schematic illustration which shows some examples of the present invention applied in various configurations of the loop coils.
Figure 11B:
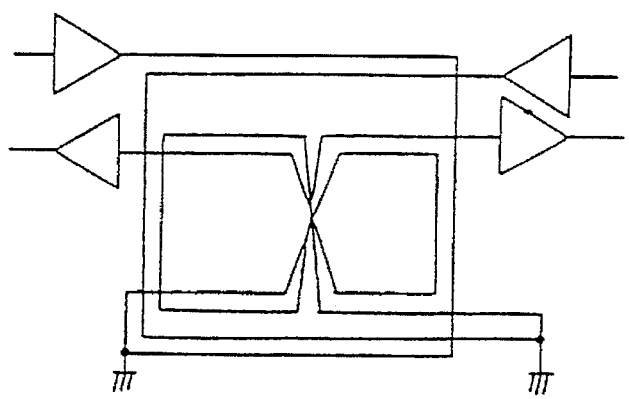
Figure 11C:
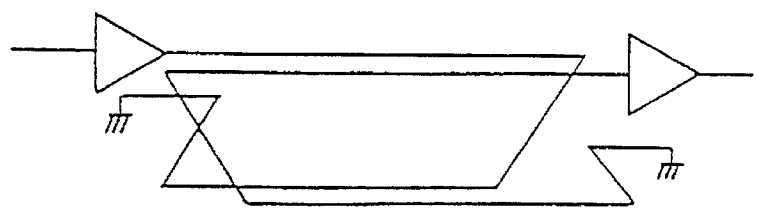
Figure 11D:
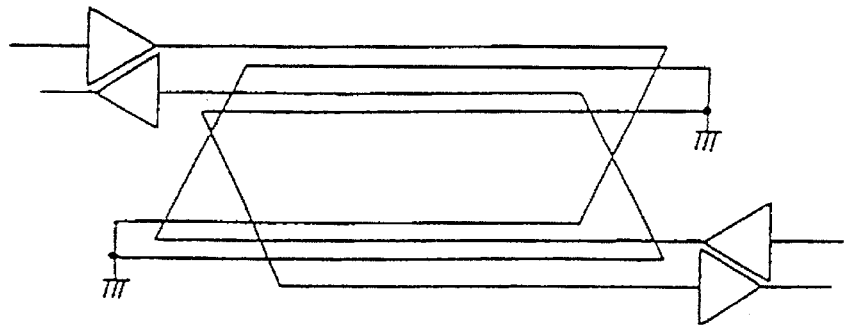

These alternate signal transmitting or receiving type configurations shown in FIG. 8 allow the pattern of loop coils to be simple. Furthermore, these alternate signal transmitting or receiving configurations can completely cancel the errors generated by the unevenness in the propagation constant of the loop coil owing to the dimensional irregularity of the loop coil itself. This effect is shown in FIG. 9 in which the dimensional irregularity of the loop coil is exaggerated as the wider part R1 and the narrower part R2. In the transmitting operation, the wider part R1 provides a gently downward-inclined level owing to a lower impedance, while the narrower part R2 provides a steeply downward-inclined level owing to a high impedance. On the other hand, in the receiving operation, the wider part R1 provides a gently upward-inclined level, while the narrower part R2 provides a steeply upward-inclined level. Accordingly, the add operation of the transmitted and received signal levels can provide a constant level regardless of the unevenness in the propagation constant of the loop coil owing to the dimensional irregularity of the loop coil.

It is possible to apply the method for cancelling or reducing the errors from the signal to the other point detecting devices associated with a plurality of pointing devices available for different frequencies.

Furthermore, the present invention is not only limited to the configuration shown in FIG. 2 wherein the signal is transmitted from the loop coil in the sensor panel to the pointing device having the tuning circuit and the tuned signal generated by the electromagnetic function with the pointing device received by the loop coil in the sensor panel, but also to the other configurations shown in FIG. 3 and FIG. 4 wherein the signal is transmitted from the pointing device to the loop coil in the sensor panel and the signal is transmitted from the loop coil in the sensor panel to the pointing device. In other words, the present invention can be applied to any configurations wherein the coordinate values of the pointing device are produced by the signal generated by the electromagnetic function between the loop coil and the pointing device.

Hereinbelow, the other configurations of the loop coil will be described.

FIG. 10 shows another type of embodiment which provides a cross type detecting device for transmitting in the X-axial direction and receiving in the Y-axial direction, as an example. In detail, FIG. 10(a) is an example of such a cross type detecting constitution for receiving the signal in the Y-axial direction to detect the X-coordinate of the pointing device. Although the level of the transmitted signal in the X-axial direction from a transmitter A1 is lowered in proportion to the distance along a loop coil 100 between the transmitter and the detected point as shown in the graph of FIG. 10(a'), the received signals from two pairs of loop coils 402 are used for arithmetic operation. The level of these received signals are substantially equivalent as shown 1 to 3 in the graph (a') which can be ignored so that the X-coordinate data of the pointing device can be obtained with less errors. Accordingly, the transmitted signals from the transmitter A1 at both ends are received along the Y-axial direction by receivers A2 and A3.

FIG. 10(b) shows another configuration for transmitting the signal in the Y-axial direction to detect the X-coordinate of the pointing device. In this configuration, the transmitted signals are overlapped to cancel the errors in the transmitted signals. Although the received signal in the X-axial direction provides a similar characteristic curve as shown in FIG. 10(a'), the received signals from several pairs of loop coils near the pointing device are only used to arithmetic operation. The level of these received signals are substantially equivalent so that the X-coordinate data of the pointing device can be obtained with less error. FIG. 10(c) shows another configuration using two loop coils in each axial direction for transmitting and receiving the signals at both ends and in both axial directions. This can cancel the errors in the transmitted and received signals on the same occasion.

FIG. 11 shows various configurations of the loop coils in which the present invention is applied. FIG. 11(a) is one example which includes two coils for transmitting from one coil end and receiving at the other coil end. The receiving coil is reversed at the centre to cancel the common mode magnetic noises in the received signal or cancel the transmitted signal so as to perform both transmitting and receiving operations on the same occasion. FIG. 11(b) is the modified example of FIG. 11(a) to perform both transmitting and receiving operations at both loop ends on the same occasion. FIG. 11(c) is another example which includes two coils for transmitting from one coil end and receiving at the other coil end. The two loop coils are perpendicular to each other, and the sensor panel and each coil meet at an angle of 45°. FIG. 11 d) is the modified example of FIG. 11(c) to perform both transmitting and receiving operations at both loop ends on the same occasion.

The configurations as shown in FIG. 10 and FIG. 11 prevent each of the transmitting coil and the receiving coil from electromagnetically coupling, and allow each coil to generate the electromagnetic function with the pointing device on the sensor panel. Japanese Patent Application Open-Publication No. 5-214722/1993 discloses one configuration using two loop coils prevented from electromagnetically coupling as shown in FIG. 10 and FIG. 11 to form a positive feedback loop between the amplifier and the pointing device so that the oscillated signal from this positive feedback loop is detected as the detected signal representing the location of the pointing device.

Figure 12A:
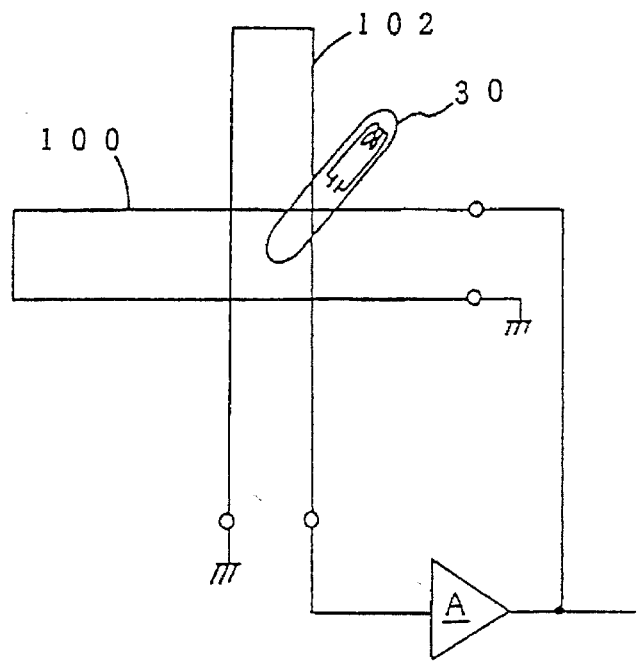
FIG. 12 is a schematic illustration which shows two configurations for embodying a self oscillating type detecting method as conventional art (a) and the present invention (b)
Figure 12B:
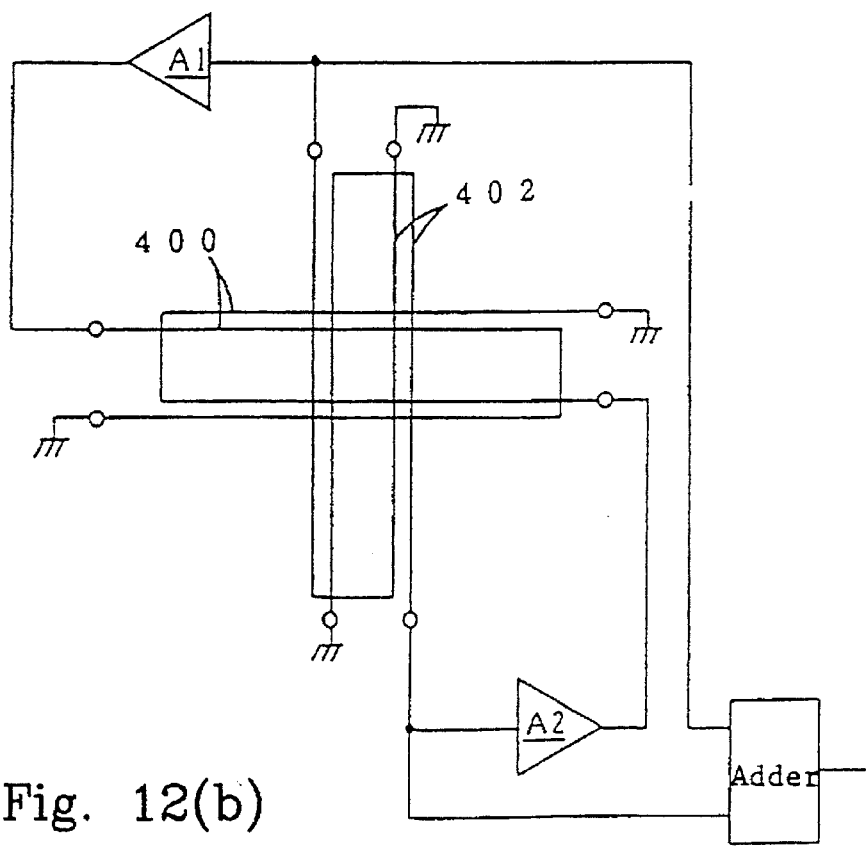

FIG. 12 shows two configurations for embodying a self oscillating type of detecting method as conventional art (a) and the present invention (b). In FIG. 12(a) two loop coils 100 and 102 are prevented from electromagnetically coupling, but they are each allowed to generate electromagnetic function with a pointing device 30 when it is located on the sensor panel. Under this condition, the pointing device 30 and these two loop coils 100 and 102 define a positive feedback loop for an amplifier "A" which oscillates. However, this detecting system may also be affected by a long loop coil. In order to resolve this problem, the configuration shown in FIG. 12(b) including loop coil pairs 400 and 402 is employed to form both positive feedback loops for amplifiers A1 and A2 to generate oscillating signals from both ends in each axial direction. These generated signals are added to cancel the errors in the signal level and phase. Since the amplifiers of this embodiment include automatic gain control (AGC) function or output limiting function, the oscillated signal is extracted from the input terminal of the amplifier. In the configurations shown in FIG. 13 described below, the oscillated signal is also extracted in the same manner as above. After extracting, the oscillated signals from the input terminals of the amplifiers A1 and A2 are subjected to an add operation.

FIG. 13 shows various configurations which are modified examples of FIG. 12(b). That is, the method according to the present invention is embodied in these configurations with a single amplifier to detect the pointing device by using the oscillated signals. FIG. 13(a) is a first example to receive the signal pair from both ends of the loop coil pair 400 on the same occasion and input the signal pair to an amplifier A via an adder. Then the amplifier A simultaneously feeds output signals to both ends of the loop coil pair 402. When the electromagnetic function is generated between the pointing device and the loop coil pair 400 or 402, a positive feedback loop for the amplifier A is formed to transmit the oscillated signal. The addition of the signals from both ends of the loop coil pair 400 and the added signals fed to both ends of the loop coil pair 402 can eliminate the errors owing to the propagation constants of the loop coils of the loop coil pairs 400 and 402 from the oscillated signals.

Figure 13A:
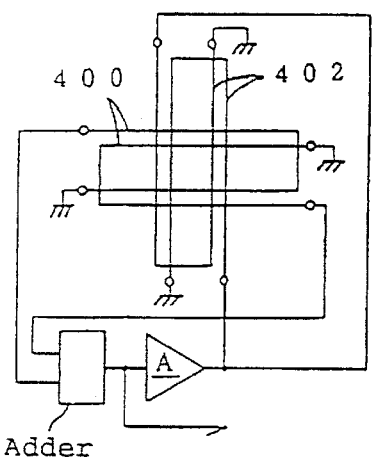
FIG. 13 is a schematic illustration which shows various configurations for embodying a self oscillating type detecting method according to the present invention.
Figure 13B:
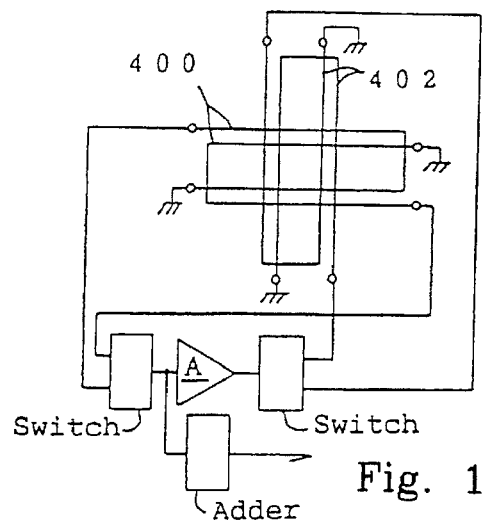

FIG. 13(b) is a second example which includes two switching means in addition to the construction shown in FIG. 13(a) to switch between both ends of the loop coil pair 400 and both end of the loop coil pair 402 so that the oscillated signals are alternately generated at regular intervals. These alternately oscillated signals are subjected to the add operation so as to cancel the errors in the signals. This operation is applied to the signals extracted from the input terminal from the amplifier A.

Figure 13C:
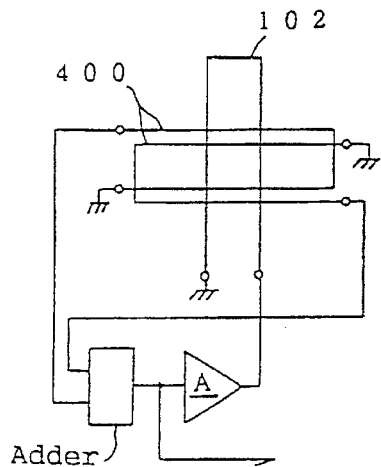
Figure 13D:
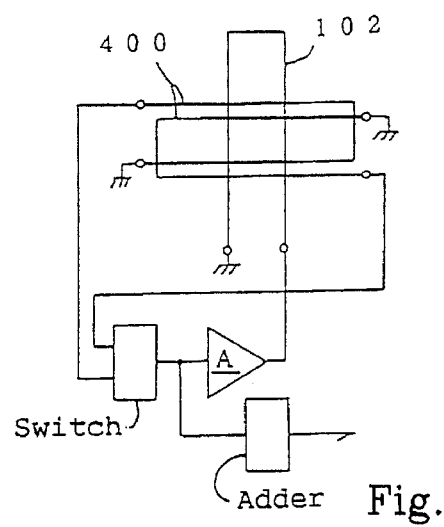

FIG. 13(c) and FIG. 13(d) are third and fourth examples which include one loop coil pair in X axial direction and a single loop coil in Y axial direction. In FIG. 13(c), the signals from both ends of the loop coil pair 400 are input to the amplifier A via the adder and then the amplifier A feeds the added signal to one end of the single coil 102. In FIG. 13(d), the signals from both ends of the loop coil pair 400 are alternately switched at a regular interval to generate a pair of oscillated signals. These oscillated signals are successively extracted from the input terminal of the amplifier A and subjected to the add operation.

Figure 13E:
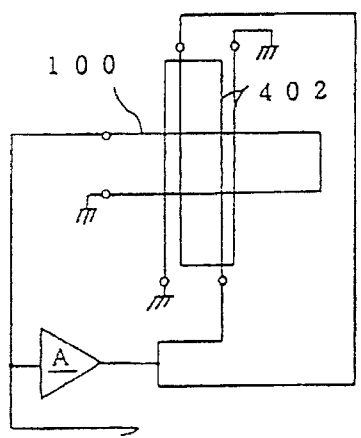
Figure 13F:
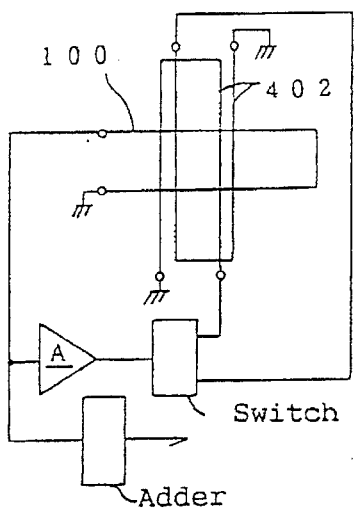

FIG. 13(e) and FIG. 13(f) are fifth and sixth examples which include a single loop coil in X axial direction and one loop coil pair in Y axial direction. In FIG. 13(e), the signal from one end of the single loop coil 100 is input to the amplifier A and then the amplifier A feeds the signal to both ends of the loop coil pair 402 on the same occasion. In FIG. 13(f), the signals to both ends of the loop coil pair 402 are alternately switched to generate a pair of oscillated signals at regular intervals. These oscillated signals are succeedingly extracted from the input terminal of the amplifier A and then subjected to the add operation.

Figure 14A:
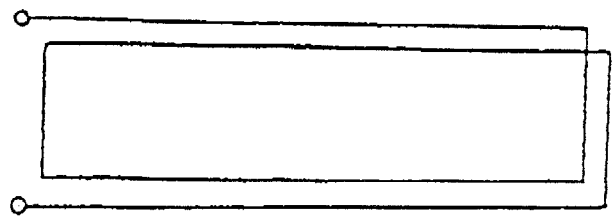
FIG. 14 is a schematic illustration which shows two different configurations, (a) and (b), each including only a double looped coil, and a configuration (c) including a double looped coil combined with the present invention.
Figure 14B:
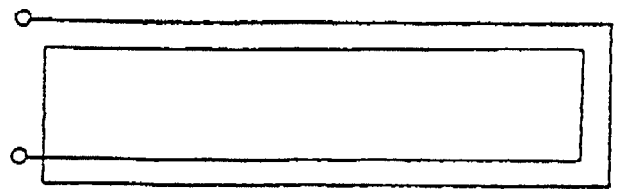
Figure 14C:
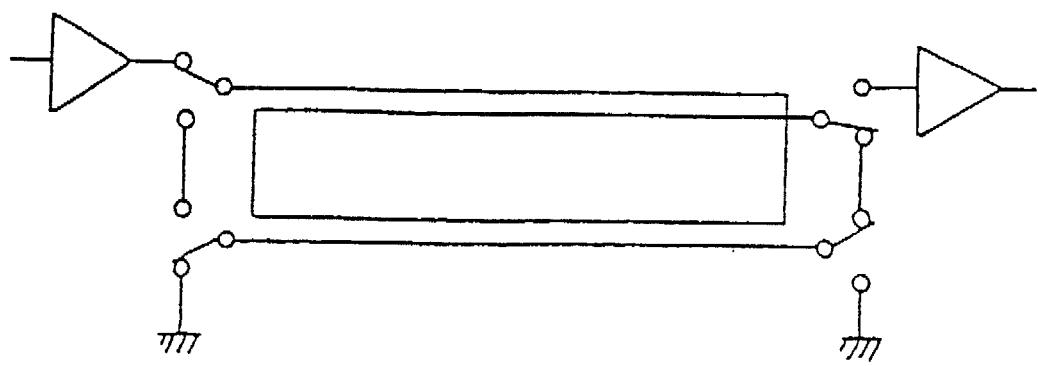

FIG. 14 shows various configurations for explaining the effects caused by double looped coils. Such double looped coils provide the improvement in absolute sensitivity and further the effect to cancel the errors owing to the position on the loop coil to some extent. In the conventionally used scale, one example of double looped coil shown in FIG. 14(a) has been available in practical scenarios. However, the relatively long double looped coil cannot be satisfactory to cancel the errors owing to the propagation constant of the loop coil. To improve this defect, as shown in FIG. 14(c), such a double looped coil is associated with the system according to the present invention to cancel the errors owing to the propagation constant of the loop coil. This improved constitution can provide the error cancelling effect owing to the system according to the present invention in addition to the improvement in absolute sensitivity and the error cancelling effect owing. to this double looped coil. Furthermore, the constitution shown in FIG. 14(c) allows the loop pattern to be simple. The double looped coil is not advantageously combined with the constitution including loop coil pair because the combined pattern would be too complicated. Thus the double looped coil is available for any constitutions shown in FIG. 8.

FIG. 15 shows two constitutions for explaining the improvement in the method for overlapping the loop coil pair. In the constitution shown in FIG. 15(a), the coordinates of the peak line of the added signal level are shifted upwards when the pointing device is located at the left side with respect to the centre in FIG. 15, or shifted downwards when the pointing device is located at the right side. The coordinates of the peak line of the added signal level ideally should be located at the center in the width of the loop coil pair L1 and L2. On the other hand, the constitution shown in FIG. 15(b) can always keep the coordinates of the peak line of the added signal level at the center in the width of the loop coil pair L1 and L2 regardless of the position of the pointing device on the loop coil pair.

The same phenomena would be generated in the double looped coil shown in FIG. 14 as FIG. 15. For example, in the double looped coil shown in FIG. 14(b), the coordinates of the peak line of the added signal level are shifted upwards when the pointing device is located at the left side with respect to the centre in FIG. 14, or shifted downwards when the pointing device is located at the right side. In the double looped coil shown in FIG. 14(a), the coordinates of the peak line of the added signal level can always be located at the center in the width of the loop coil pair regardless of the position of the pointing device on the loop coil pair.

Figure 16:
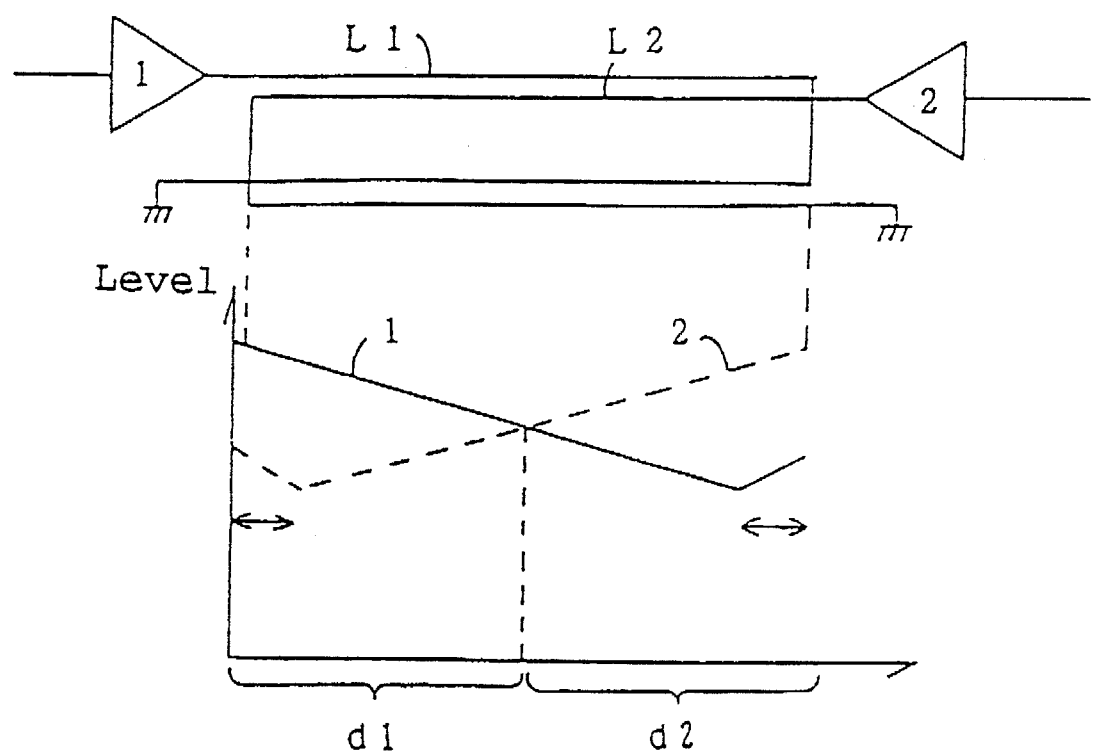
FIG. 16 is a schematic illustration which shows the signal error caused by the leakage of magnetic flux owing to the external magnetic function in the region of loop end (turning end of the loop coil)

FIG. 16 shows the signal error caused by the leakage of magnetic flux owing to the external magnetic function in the region of the loop end or turning end of the loop coil. This configuration includes two transmitters at both ends of the loop coil pair. As shown in the graph of FIG. 16, the level of the transmitted signals from both ends have suddenly risen in the region of the loop ends marked with the arrows ←→. These suddenly risen levels cannot be cancelled by the above described add operation of both signals. In order to overcome this defect, the point detecting operation is performed by using either the transmitted signal from the transmitter 1 at the left end when the pointing device is located in the region d1 including the left loop end of the loop coil L2, or the transmitted signal from the transmitter 2 at the right end when the pointing device is located in the region d2 including the right loop end of the loop coil L1. These two regions d1 and d2 are defined by any suitable manner, such as separating the loop coil pair into left and right half sides with respect to the center as shown in FIG. 16. When the pointing device is located at one loop end of one of the loop coils, the other loop coil is preferably used for transmitting or receiving. For signal receiving operation, the receivers at both ends are selectively used in the separated regions to prevent the loop end from suffering to the magnetic affection. In the configurations shown in FIG. 8(a) to FIG. 8(c) including a single loop coil whose open end connected to the transmitter or receiver and loop end is converted by a switching means, when the pointing device is located at the loop end in one switching mode, transmitting or receiving operation can be performed in the other switching mode.

In the configurations except for the cross type detecting devices, after the point is temporarily detected, it can be decided which loop coil is preferably used to perform the transmitting or receiving operation. In the cross type detecting device, as shown in FIG. 10(a), when the loop coil 100 is intersected perpendicularly to the loop coil pair 402 located in the upper half; i.e., close to the receiver A2, and the transmitter A1 transmits a signal, the receiver A2 is activated to receive the signal for detecting the pointing device. When the loop coil 100 is located in the lower half; i.e., close to the receiver A3, the receiver A3 is activated to receive the signal for detecting the pointing device.

Figure 17A:
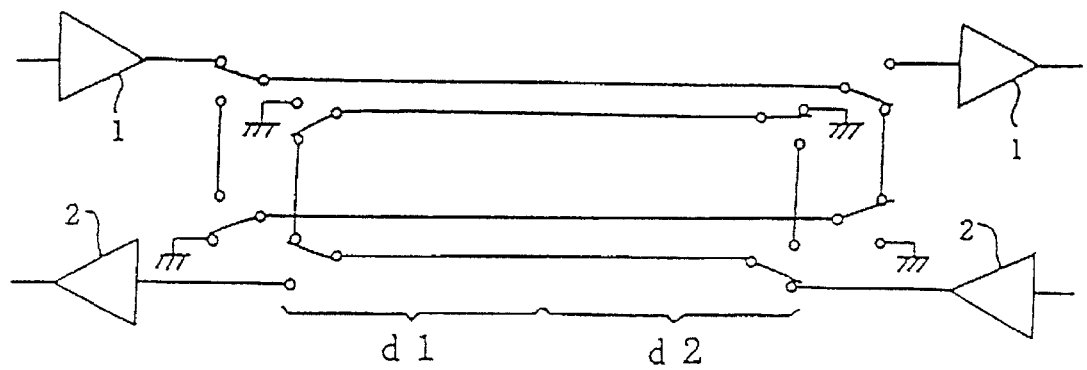
FIG. 17 is a schematic illustration which shows various constitutions for cancelling the errors caused by the magnetic affection at loop ends of the loop coil arrangement for alternate transmitting or receiving.
Figure 17B:
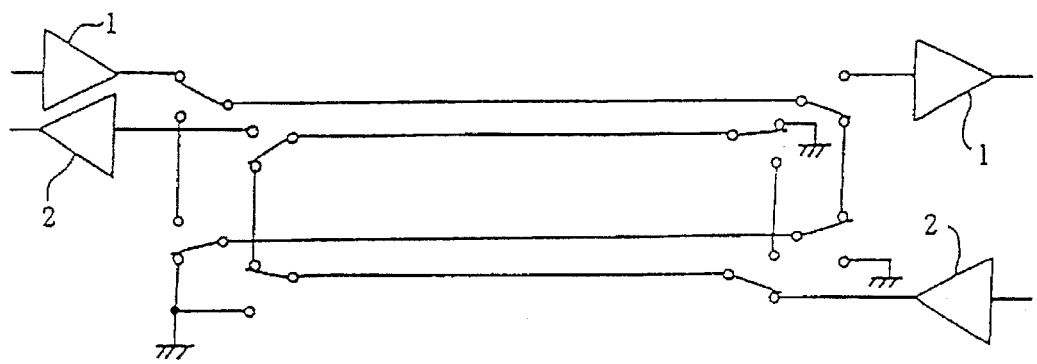
Figure 17C:
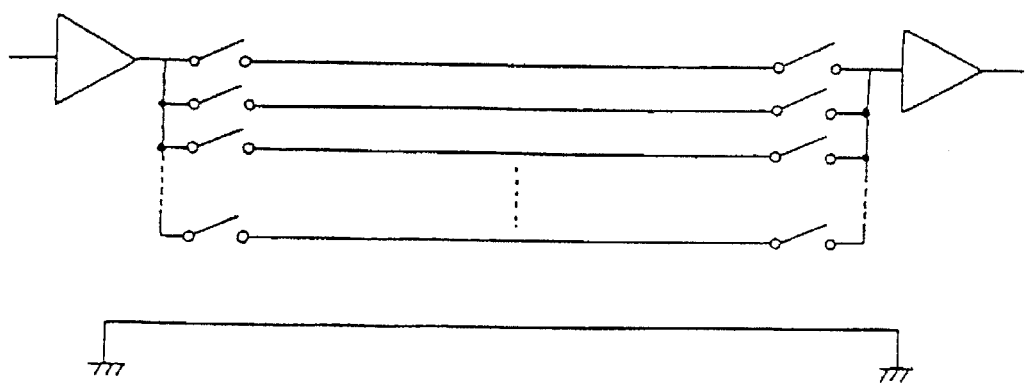

FIG. 17 shows various constitutions for cancelling the errors caused by the magnetic affection at loop ends of the loop coil shown in FIG. 6 and FIG. 8(d). Since the constitutions shown in FIG. 6 and FIG. 8(d) include one transmitter at one end and one receiver at the other end, the method shown in FIG. 16 can not be directly applied to these constitutions. The constitution shown in FIG. 8(d) may be reversely duplicated as shown in FIG. 17(a). In order to easily understand, these two loop coils are separated from each other. Actually, they are intimately overlapped. The transmitter and receiver pair 1 is used when the pointing device is located within the region d1, while the other pair 2 is used within the region d2. This configuration and switching operation can eliminate the errors caused by the magnetic affection at their loop ends. FIG. 17(b) shows a differential receiving type of the constitution shown in FIG. 17(a) to provide the effect for cancelling the common mode magnetic noises. Furthermore, FIG. 17(c) shows another constitution which does not include the turning ends of the loop coils at all. In this constitution, each detecting means corresponds to each single straight line which is connected to a common grounding line as a returning line.

Figure 18A:
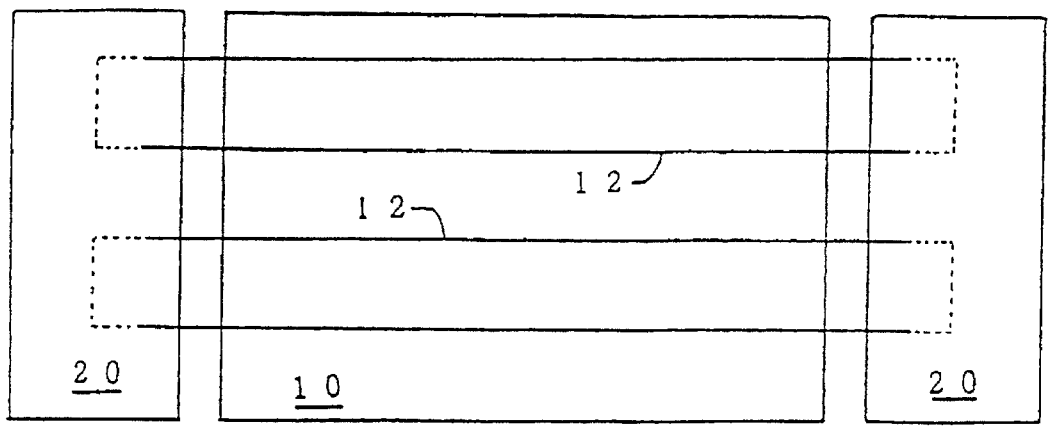
FIG. 18 is a schematic illustration which shows other constitutions for protecting the loop ends of the loop coil arrangement from magnetic affection.
Figure 18B:
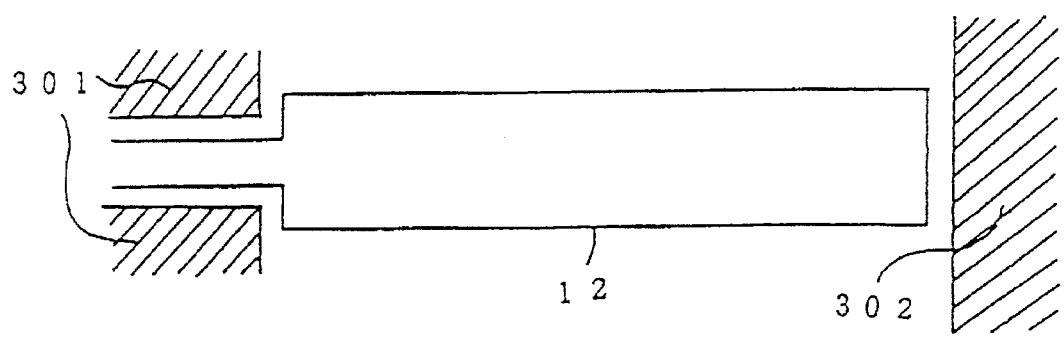

FIG. 18 shows other examples for protecting the loop ends of the loop coil arrangement from magnetic affection. In the constitution shown in FIG. 18(a), the turning ends of the loop coils 12 are laid on the printed substrate of the side boards 20 to prevent the loop ends from the change of magnetic flux. Furthermore, some leads connected to the associated transmitters or receivers may be laid on the printed substrate. FIG. 18(b) shows an example for providing a magnetic shield which is formed by surrounding the loop end or terminal of the loop coil 12 with particular material having a magnetic shielding effect, or grounded conductive materials 301 and 302.

Figure 19A:
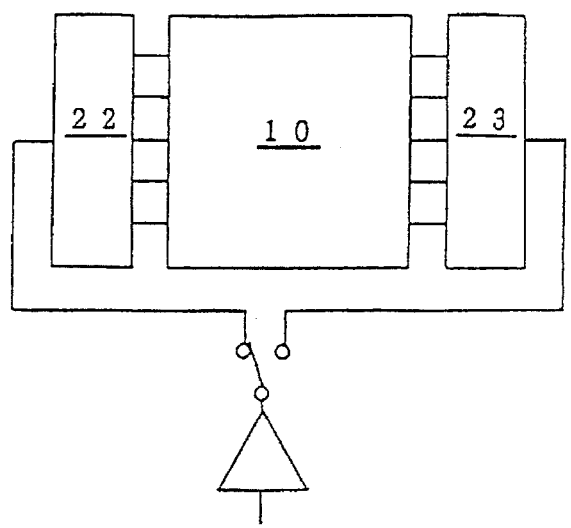
FIG. 19 is a schematic illustration which shows various arrangements of a transmitter or receiver in an alternate transmitting or receiving operation.
Figure 19B:
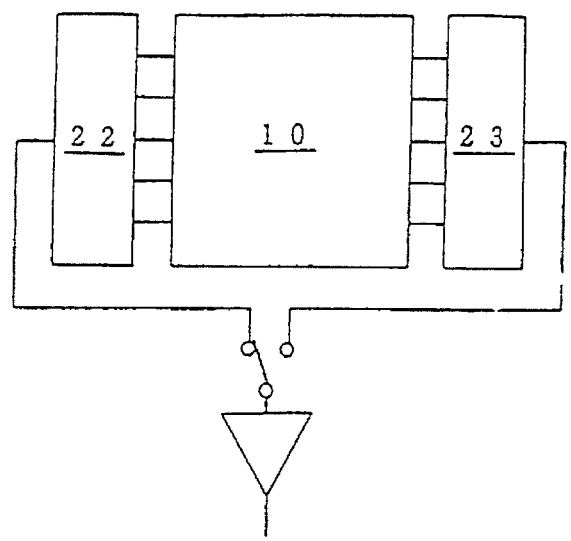
Figure 19C:
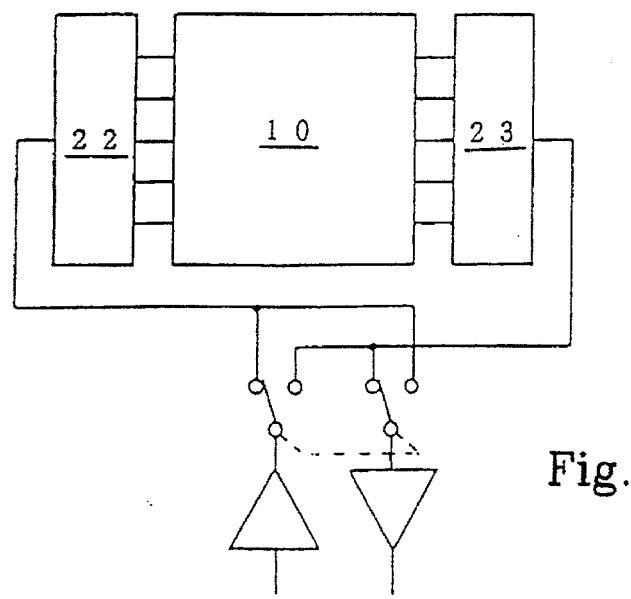

FIG. 19 shows various arrangements of a transmitter or receiver in an alternate transmitting or receiving operation. As explained above, although such alternate transmitting or receiving operation is performed by two transmitters or receivers arranged at respective ends of the loop coil, only one is used for performing such an operation. Accordingly, one transmitter or receiver may be switched for performing transmitting or receiving operations from each end as shown in FIG. 19(a) or FIG. 19(b). These configurations can reduce such transmitter or receiver. According to the same reason, alternate transmitting and receiving operations may be simultaneously performed by one transmitter and one receiver which are alternately connected to either one end via switching means as shown in FIG. 19(c) rather than the constitution including a pair of transmitters and a pair of receivers. Also the constitutions shown in FIG. 19 may be applied to the given examples including at least one of switching means as shown in FIG. 16 and FIG. 17.

Figure 20A:
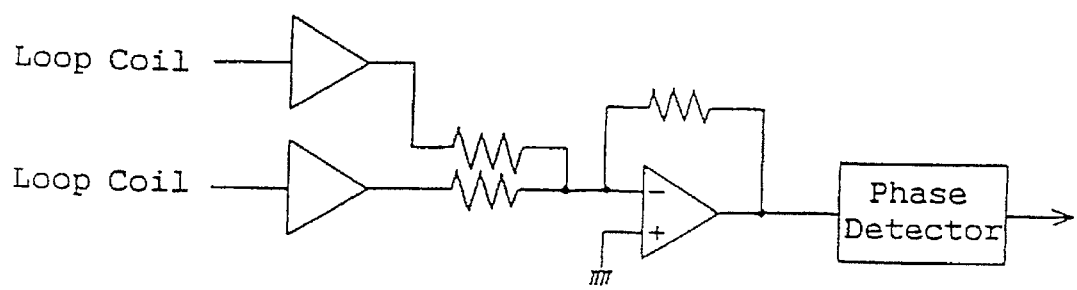
FIG. 20 is a schematic illustration which shows two constitutions including a means for performing an add operation in a preamplifier of the signal detecting unit.
Figure 20B:
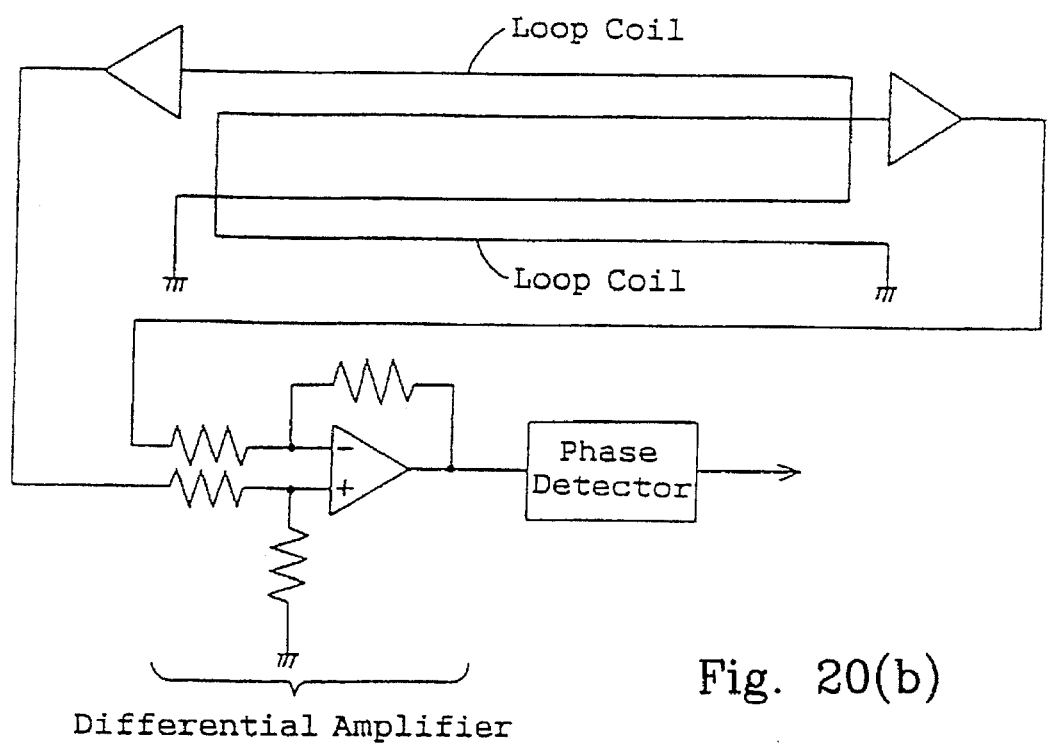

FIG. 20 and FIG. 21 show various examples of means for performing add operation. As shown in FIG. 20(a) and FIG. 20(b), the add operation is performed in a preamplifier which is a signal input section of the signal detecting unit 50. This arrangement is effective particularly for simultaneously received signals. In detail, FIG. 20(a) shows one example of add operation adapted for the common mode signals generated from respective loop coils of the loop coil pair. These signals are simultaneously input to the same input terminal of the arithmetic amplifier to add them. The added signals are properly amplified and then output to the succeeding phase detector. FIG. 20(b) shows another example of add operation adapted for the reverse phase signals generated from the two loop coils which are wound in reverse to each other. These reverse phase signals are respectively input to the common phase input terminal and the reverse phase input terminal so that these signals can be added and the common phase noise can be eliminated from these signals on the same occasion. This arithmetic amplifier acts as a differential amplifier. These added signals are properly amplified and fed to the successive process.

Figure 21A:
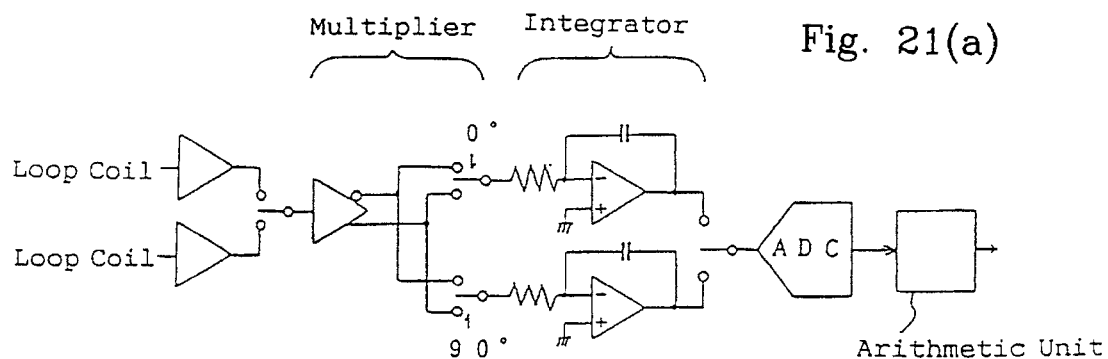
FIG. 21 is a schematic illustration which shows two constitutions including a means for performing an add operation in a phase detector of the signal detecting unit.
Figure 21B:
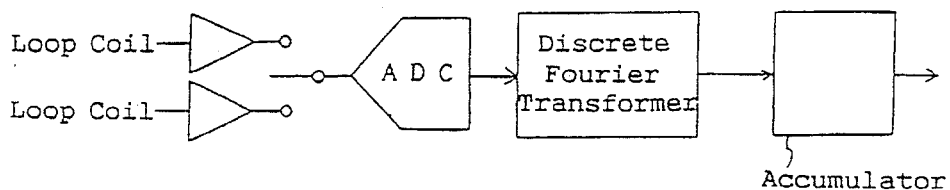

FIG. 21 shows two examples for performing the add operation in the phase detector of the signal detecting unit 50, and are particularly effective for the alternate receiving. In detail, FIG. 21(a) shows an example employing an analog phase detector which is a signal processing circuit to generate the real number part of the aimed frequency component of the received signals by integration after multiplication of the received signals and 0° detected signal, and the imaginary number part by integration after multiplication of the received signals and 90° detected signal. The received signals from alternate receiving include a pair of signals generated from respective loop coils at a regular interval period. A series of the signal pairs are successively integrated by the integrator as shown in FIG. 21(a) to generate an output signal of the phase detector. This output signal is then fed to an analog-digital converter and further an arithmetic unit to generate the values representing amplitude and phase angle. Alternatively, respective signals may be subjected to add operation accumulatingly by an arithmetic unit after the phase detection and the analog-digital conversion. FIG. 21(b) shows an example employing a digital phase detector which is a signal processing circuit to generate the real number part and imaginary number part of the aimed frequency component of the received signals by discrete Fourier-transforming through a multiplier after analog digital conversion at high speed sampling. Accordingly, a pair of signals received by alternate receiving are added by an accumulator after the discrete Fourier-transforming step.

As detailed in the above explanation, one typical embodiment of the present invention provides a constitution for transmitting signals from both ends of the electromagnetic coupling means towards the pointing device, and/or receiving at both ends the signals generated by the electromagnetic function between the electromagnetic coupling means and the pointing device. The errors owing to the variations caused in the signal level and phase in response to the propagation constant of the electromagnetic coupling means can be reduced by adding these received signal pair.

Another embodiment of the present invention provides the constitution for transmitting signals from one end of the electromagnetic coupling means towards the pointing device and receiving at the other end the signals generated by the electromagnetic function between the electromagnetic coupling means and the pointing device. The errors owing to the variations caused in the signal level and phase in response to the propagation constant of the electromagnetic coupling means can be cancelled.

Furthermore, another embodiment of the point detecting device according to the present invention can reduce the fluctuation generated in the signal level owing to the unequivalent impedance of one loop coil. As a result, the phase detecting accuracy of the point detecting device can be improved.

Since still further embodiment of the point detecting device according to the present invention is provided with means for eliminating the errors generated by the magnetic function at the turning end of the loop coil, this device can provide the accuracy of a point detecting operation.

Using both transmitting and receiving operations simultaneously at both ends of the electromagnetic coupling means can provide a high speed detecting operation. Alternate operation allows the pattern of the electromagnetic coupling means and its associated circuit to be simplified.

Since various constitutions according to the present invention can generate the received signal with less errors or cancelled errors, the coordinates arithmetic operation or ON or OFF discriminating operation with respect to the pointing device can be accurately performed. Particularly, this effect is remarkably shown in the point detecting device having a large sized and high impedance electromagnetic coupling means. Accordingly, the electromagnetic coupling means such as a loop coil can be made of commonly used conductive metal materials which are relatively cheap compared with aluminum and in a low cost screen printing manner rather than a high cost vacuum evaporation.

Consequently, the detecting device and method according to the present invention can be advantageously applied to a large sized computer graphic system with a high accuracy and a low cost.

As many apparently widely different embodiments of this invention may be made without departing from the spirit and scope thereof, it is to be understood that the invention is not limited to the specific embodiments thereof except as defined in the appended claims.

What is claimed is:

1. A point detecting device including a point sensing area and a pointing device capable of moving over the point sensing area, further comprising;
   a plurality of electromagnetic coupling means arranged in parallel in a first axial direction within the point sensing area;
   a pair of signal receivers each of which is arranged at either end of a second axial direction of the electromagnetic coupling means intersected perpendicularly to the first axial direction so that the signal receiver can receive the signal generated by the electromagnetic function between the electromagnetic coupling means and the pointing device located above the electromagnetic coupling means; and
   a signal processor including an adder for adding the received signals by the receivers and means for arithmetically operating the coordinate values of the pointing device.

2. The point detecting device as set forth in claim 1, wherein the electromagnetic coupling means comprises a pair of loop coils arranged close to each other, each one of which is connected to either one of the receiver pair.

3. The point detecting device as set forth in claim 1 further comprising a plurality of selecting switches arranged at both ends of the second axial direction of the electromagnetic coupling means for switching between one of the loop coil connected to one of the receivers and the other loop coil connected to the other receiver to establish the electromagnetic coupling means.

4. A point detecting device including a point sensing area and a pointing device capable of moving over the point sensing area, further comprising:
   a plurality of electromagnetic coupling means arranged in parallel in a first axial direction within the point sensing area;
   a pair of signal transmitters each of which is arranged at either end of a second axial direction of the electromagnetic coupling means intersected perpendicularly to the first axial direction so that the transmitter can transmit signal to the electromagnetic coupling means; and
   a signal processor for signal processing the signal generated by the electromagnetic function between the transmitted signal pair and the pointing device to obtain the coordinate values of the pointing device.

5. The point detecting device as set forth in claim 4, wherein the above described electromagnetic coupling means comprises a pair of loop coils arranged close to each other, each one of which is connected to either one of the transmitter pair.

6. The point detecting device as set forth in claim 4 further comprising a plurality of selecting switches arranged at both ends of the second axial direction of the electromagnetic coupling means for switching between one of the loop coil connected to one of the transmitter and the other loop coil connected to the other transmitter to establish the electromagnetic coupling means.

7. A point detecting device including a point sensing area and a pointing device capable of moving over the point sensing area, further comprising:
   a plurality of electromagnetic coupling means arranged in parallel in a first axial direction within the point sensing area;
   a pair of signal transmitters each of which is arranged at either end of a second axial direction of the electromagnetic coupling means intersected perpendicularly to the first axial direction;
   a pair of signal receivers each of which is arranged at either end of the second axial direction of the electromagnetic coupling means intersected perpendicularly to the first axial direction so that the signal receiver can receive the signal generated by the electromagnetic function between the electromagnetic coupling means and the pointing device located above the electromagnetic coupling means;
   a selecting means for selecting either the transmitter or receiver arranged at each end of the electromagnetic coupling means; and
   a signal processor including an adder for adding the received signals by the receivers and means for operating arithmetically the coordinate values of the pointing device.

8. The point detecting device as set forth in claim 7, wherein the above described electromagnetic coupling means comprises a pair of loop coils arranged close to each other, each of which is connected to either of the transmitter and receiver through the selecting means.

9. The point detecting device as set forth in claim 7 further comprising a plurality of selecting switches arranged at both ends of the second axial direction of the electromagnetic coupling means for switching between one of the loop coil connected to one of the transmitter or receiver and the other loop coil connected to the other transmitter or receiver to establish the electromagnetic coupling means.

10. A point detecting device including a point sensing area and a pointing device capable of moving over the point sensing area, further comprising;
   a plurality of first loop coil pairs each pair of which includes two loop coils arranged close to each other and pairs are arranged in parallel in a first axial direction within the point sensing area;
   a plurality of second loop coil pairs each pair of which includes two loop coils arranged close to each other and pairs are arranged in parallel in a second axial direction intersected perpendicularly to the first axial direction;
   a pair of signal transmitters each of which is arranged at either end of the second axial direction of the second loop coil pairs to transmit signal towards the above portion with respect to each coil of the second loop coil pairs;
   a pair of signal receivers each of which is arranged at either end of the second axial direction of the first loop coil pairs to receive the signal generated by the electromagnetic function between the pointing device and each loop coil; and
   a signal processor including an adder for adding the received signal pair with the receiver pair and means for operating arithmetically the coordinate values of the pointing device.

11. A point detecting device including a point sensing area and a pointing device capable of moving over the point sensing area, further comprising;
- a plurality of loop coil pairs each pair of which includes two loop coils arranged close to each other and which are arranged in parallel in a first axial direction within the point sensing area;
- a plurality of loop coil pairs each pair of which includes two loop coils arranged close to each other and pairs are arranged in parallel in a second axial direction intersected perpendicularly to the first axial direction;
- a pair of signal transmitters each of which is arranged at either end of the second axial direction of the above described loop coil pair to transmit a signal towards the above portion with respect to each coil of the above described loop coil pair;
- a pair of signal receivers each of which is arranged at either end of the first axial direction of the above described loop coil pair to receive the signal generated by the electromagnetic function between the pointing device and each loop coil; and
- a signal processor including an adder for adding the received signal pair with the receiver pair and means for operating arithmetically the coordinate values of the pointing device.

12. A point detecting device including a point sensing area and a pointing device capable of moving over the point sensing area, further comprising:
- a plurality of loop coil pairs each pair of which includes two loop coils arranged close to each other and which pairs are arranged in parallel in a first axial direction within the point sensing area;
- a plurality of loop coils arranged in parallel in a second axial direction intersected perpendicularly to the first axial direction;
- a signal transmitter arranged at one end of the first axial direction of the above described loop coil to transmit the signal towards the above portion with respect to the above described loop coil;
- a pair of signal receivers each of which is arranged at either end of the second axial direction of the above described loop coil pair to receive the signal generated by the electromagnetic function between the pointing device and each loop coil of the loop coil pair; and
- a signal processor including an adder for adding the received signal pair with the receiver pair and means for operating arithmetically the coordinate values of the pointing device.

13. A point detecting device including a point sensing area and a pointing device capable of moving over the point sensing area, further comprising:
- a plurality of electromagnetic coupling means arranged in parallel in a first axial direction within the point sensing area;
- a signal transmitter arranged at one end of the second axial direction of the electromagnetic coupling means intersected perpendicularly to the first axial direction;
- a signal receiver arranged at the other end of the second axial direction of the electromagnetic coupling means so that the signal receiver can receive the signal generated by the electromagnetic function between the electromagnetic coupling means and the pointing device located above the electromagnetic coupling means; and
- a signal processor for operating arithmetically the coordinate values of the pointing device.

14. The point detecting device as set forth in claim 13, wherein the above described electromagnetic coupling means comprises a pair of loop coils arranged close to each other;
- the above described signal transmitter transmits signal to one of loop coil of the loop coil pair; and
- the above described signal receiver receives signal from the other loop coil of the loop coil pair.

15. The point detecting device as set forth in claim 13 further comprising a plurality of selecting switches arranged at both ends of the second axial direction of the electromagnetic coupling means for switching between one of the loop coil connected to the transmitter and the other loop coil connected to the receiver to establish the electromagnetic coupling means.

16. A point detecting device including a point sensing area and a pointing device capable of moving over the point sensing area, further comprising:
- first and second electromagnetic coupling means which are prevented from electromagnetic coupling with each other;
- a first amplifier which oscillates when a positive feedback loop is formed by the first amplifier, the pointing device, the above first electromagnetic coupling means one end of which is connected to an input terminal, and the second electromagnetic coupling means one end of which is connected to an output terminal;
- a second amplifier which oscillates when a positive feedback loop is formed by the second amplifier, the pointing device, the above first electromagnetic coupling means the other end of which is connected to an input terminal, and the second electromagnetic coupling means the other end of which is connected to an output terminal;
- a signal processor including an adder for adding the oscillated signal pair from the input terminals of the first and second amplifiers and means for operating arithmetically the coordinate values of the pointing device;
- the above described first electromagnetic coupling means including a pair of loop coils arranged close to each other one of which is connected to the input terminal of the first amplifier and the other loop coil is connected to the input terminal of the second amplifier; and
- the above described second electromagnetic coupling means including a pair of loop coils arranged close to each other one of which is connected to the output terminal of the first amplifier and the other loop coil is connected to the output terminal of the second amplifier.

17. A point detecting device including a point sensing area and a pointing device capable of moving over the point sensing area, further comprising;
- first and second electromagnetic coupling means which are prevented from electromagnetic coupling with each other;
- an amplifier which oscillates when a positive feedback loop is formed by the amplifier, the pointing device, and the above first and second electromagnetic coupling means;
- an adding means for adding the signals from both ends of the first electromagnetic coupling means and inputting the added signal to the above described amplifier;
- an outputting means for outputting the output from the above described amplifier to both ends of the electromagnetic coupling means;

a signal processor for operating arithmetically the oscillated signal from the input terminal of the above described amplifier to provide the coordinate values of the pointing device;

the above described first electromagnetic coupling means including a pair of loop coils arranged close to each other, opposite ends of which are respectively connected to the input terminal of the above described adder; and the above described second electromagnetic coupling means including a pair of loop coils arranged close to each other opposite ends of which are respectively connected to the output terminal of the above described amplifier.

18. A point detecting device including a point sensing area and a pointing device capable of moving over the point sensing area, further comprising:

first and second electromagnetic coupling means which are prevented from electromagnetic coupling with each other;

an amplifier which oscillates when a positive feedback loop is formed by the amplifier, the pointing device, the above described first and second electromagnetic coupling means;

a first switching means for selecting either signal from either end of the first electromagnetic coupling means to input the selected signal to the above described amplifier;

a second switching means for selecting either end of the second electromagnetic coupling means to output the signal from the above described amplifier;

a signal processor including an adding means for adding first and second oscillated signals through the input terminal of the above described amplifier and means for operating arithmetically the coordinate values of the pointing device, the first oscillated signal being fed to the adding means when the first switching means selects one end of the first electromagnetic coupling means and the second switching means selects one end of the second electromagnetic coupling means, and the second oscillated signal being fed to the adding means when the first switching means selects the other end of the first electromagnetic coupling means and the second switching means selects the other end of the second electromagnetic coupling means;

the above described first electromagnetic coupling means including a pair of loop coils arranged close to each other, opposite ends of which are respectively connected to the switching terminal of the above described first switching means; and the above described second electromagnetic coupling means including a pair of loop coils arranged close to each other, opposite ends of which are respectively connected to the switching terminal of the second switching means.

19. A point detecting device including a point sensing area and a pointing device capable of moving over the point sensing area, further comprising:

first and second electromagnetic coupling means which are prevented from electromagnetic coupling with each other;

an amplifier which oscillates when a positive feedback loop is formed by the amplifier, the pointing device, and the above first and second electromagnetic coupling means, one end of the second electromagnetic coupling means of which is connected to an output terminal of the amplifier;

an adding means for adding the signals from both ends of the first electromagnetic coupling means and inputting the added signal to the above described amplifier;

a signal processor for operating arithmetically the oscillated signal from the input terminal of the above described amplifier to provide the coordinate values of the pointing device;

the above described first electromagnetic coupling means including a pair of loop coils arranged close to each other, opposite ends of which are respectively connected to the input terminal of the above described adder; and the above described second electromagnetic coupling means including a loop coil.

20. A point detecting device including a point sensing area and a pointing device capable of moving over the point sensing area, further comprising:

first and second electromagnetic coupling means which are prevented from electromagnetic coupling with each other;

an amplifier which oscillates when a positive feedback loop is formed by the amplifier, the pointing device, and the above first and second electromagnetic coupling means, one end of the second electromagnetic coupling means of which is connected to an output terminal of the amplifier;

a switching means for selecting either signal from either end of the first electromagnetic coupling means to input the selected signal to the above described amplifier;

a signal processor including an adding means for adding first and second oscillated signals through the input terminal of the above described amplifier and means for operating arithmetically the coordinate values of the pointing device, the first oscillated signal being fed to the adding means when the switching means selects one end of the first electromagnetic coupling means and the second oscillated signal being fed to the adding means when the switching means selects the other end of the first electromagnetic coupling means;

the above described first electromagnetic coupling means including a pair of loop coils arranged close to each other, opposite ends of which are respectively connected to the selecting terminal of the above described switching means; and the above described second electromagnetic coupling means including a loop coil.

21. A point detecting device including a point sensing area and a pointing device capable of moving over the point sensing area, further comprising:

first and second electromagnetic coupling means which are prevented from electromagnetic coupling with each other;

an amplifier which oscillates when a positive feedback loop is formed by the amplifier, the pointing device, and the above first and second electromagnetic coupling means, one end of the first electromagnetic coupling means of which is connected to an input terminal of the amplifier;

an outputting means for outputting the output from the amplifier to both ends of the second electromagnetic coupling means;

a signal processor for operating arithmetically the oscillated signal from the input terminal of the above described amplifier to provide the coordinate values of the pointing device;

the above described first electromagnetic coupling means including a loop coil; and the above described second electromagnetic coupling means including a pair of loop coils arranged close to each other, opposite ends of which are respectively connected to the output terminal of the above described amplifier.

22. A point detecting device including a point sensing area and a pointing device capable of moving over the point sensing area, further comprising:

first and second electromagnetic coupling means which are prevented from electromagnetic coupling with each other;

an amplifier which oscillates when a positive feedback loop is formed by the amplifier, the pointing device, and the above first and second electromagnetic coupling means, one end of the first electromagnetic coupling means of which is connected to an input terminal of the amplifier;

a switching means for selecting either end of the second electromagnetic coupling means to output the selected signal from the above described amplifier;

a signal processor including an adding means for adding first and second oscillated signals through the input terminal of the above described amplifier and means for operating arithmetically the coordinate values of the pointing device, the first oscillated signal being fed to the adding means when the switching means selects one end of the second electromagnetic coupling means and the second oscillated signal being fed to the adding means when the switching means selects the other end of the second electromagnetic coupling means;

the above described first electromagnetic coupling means including a loop coil; and the above described second electromagnetic coupling means including a pair of loop coils arranged close to each other, opposite ends of which are respectively connected to the switching terminal of the above described switching means.

23. The point detecting device as set forth in claim 1, wherein the above described electromagnetic coupling means includes a pair of loop coils arranged close to each other and having reverse winding directions with each other, or a loop coil which is switched between the reverse winding directions by a switching means; the above described received signal pair are the reverse of each other; and the above described adding means is a differential amplifier to which the above described signal pair are input as two input signals.

24. The point detecting device as set forth in claim 1, wherein the above described one transmitter and the other transmitter form a common transmitter having respective transmission lines to both ends of the above described electromagnetic coupling means; or the above described one receiver and the other receiver form a common receiver having respective transmission lines from both ends of the above described electromagnetic coupling means.

25. A point detecting device which detects and processes the signal generated by an electromagnetic function between a pointing device and a plurality of electromagnetic coupling means arranged in the point detecting direction so as to obtain the coordinate values of the pointing device, wherein one of the above described electromagnetic coupling means includes a pair of loop coils arranged close to each other, each one of which has at least one of connection end for transmitting or receiving the signal and at least one turning end, or a loop coil having a switching means to switch the positions of the connection end and the turning end; and the above described point detecting device further comprising a decision means for deciding the substantial position of the pointing device according to the detected signal generated in transmitting or receiving mode which employs both loop coils of the above described loop coil pair or both switching positions of the above switching means, or according to the detected position of at least one of the cross loop coils arranged perpendicularly to the loop coil pair or the single loop coil, which are selectively used for transmitting or receiving signals; and receiving means or transmitting means, when the pointing device is located above the region including one loop coil of the above described loop coil pair or at least the turning end of one switching position, the above receiving means receiving at least one of the signals generated by the other loop coil or the other switching position, and the above transmitting means transmitting an actuating signal to generate the signal by the other loop coil or the other switching position.

26. The point detecting device as set forth in claim 25, wherein the above described region including at least the turning end is defined from the centre of the above described electromagnetic coupling means to the above described turning end.

27. The point detecting device as set forth in claim 1, wherein the above described electromagnetic coupling means includes at least one of the loop coils and the turning end of each loop coil is provided on the substrate.

28. The point detecting device as set forth in claim 1, wherein the above described electromagnetic coupling means includes at least one of the loop coils and the turning end of each loop coil is covered with or arranged near effective magnetic shielding material or grounded conductive material.

29. A point detecting method employing a point sensing area and a pointing device capable of moving over the point sensing area, further comprising steps for:

providing a plurality of electromagnetic coupling means arranged in parallel in a first axial direction within the point sensing area;

receiving alternately or simultaneously signals generated by the electromagnetic function between the electromagnetic coupling means and the pointing device located above the electromagnetic coupling means, at both or either end of a second axial direction of the electromagnetic coupling means intersected perpendicularly to the first axial direction; and performing a signal processing step including an adding operation for adding the received signal pair for arithmetically operating the coordinate values of the pointing device.

30. A point detecting method employing a point sensing area and a pointing device capable of moving over the point sensing area, further comprising steps for:

providing a plurality of electromagnetic coupling means arranged in parallel in a first axial direction within the point sensing area;

transmitting alternately or simultaneously a pair of signals to the above space of the electromagnetic coupling means from both ends of a second axial direction of the electromagnetic coupling means intersected perpendicularly to the first axial direction; and processing the signals generated by the electromagnetic function between the pointing device and the transmitted signal pairs to arithmetically operate the coordinate values of the pointing device.

31. A point detecting method employing a point sensing area and a pointing device capable of moving over the point sensing area, further comprising steps for;

providing a plurality of electromagnetic coupling means arranged in parallel in a first axial direction within the point sensing area;

simultaneously transmitting and receiving signals to the above space of the electromagnetic coupling means from both ends of a second axial direction of the electromagnetic coupling means intersected perpendicularly to the first axial direction, or transmitting and receiving a signal from one end of the above described both ends of the second axial direction of the electromagnetic coupling means and then transmitting and receiving another signal from the other end of the above described both ends so as to receive the signals generated by the electromagnetic function between the electromagnetic coupling means and the pointing device located above the electromagnetic coupling means; and performing a signal processing step including an adding operation for adding the received signal pair for arithmetically operating the coordinate values of the pointing device.

32. A point detecting method employing a point sensing area and a pointing device capable of moving over the point sensing area, further comprising steps for;

providing a plurality of electromagnetic coupling means arranged in parallel in a first axial direction within the point sensing area;

transmitting a signal to the above space of the electromagnetic coupling means from one end of a second axial direction of the electromagnetic coupling means intersected perpendicularly to the first axial direction;

receiving the signal generated by the electromagnetic function between the pointing device and the electromagnetic coupling means; and processing the received signal to arithmetically operate the coordinate values of the pointing device.

33. A point detecting method employing a point sensing area and a pointing device capable of moving over the point sensing area, further comprising steps for:

providing a plurality of first electromagnetic coupling means arranged in parallel in a first axial direction within the point sensing area;

providing a plurality of second electromagnetic coupling means arranged in parallel in a second axial direction intersected perpendicularly to the first axial direction;

simultaneously transmitting a pair of signals to the above space of the electromagnetic coupling means from both ends of the first axial direction of the second electromagnetic coupling means; simultaneously receiving the signal pair generated by the electromagnetic function between the pointing device and the electromagnetic coupling means at both ends of the second axial direction of the first electromagnetic coupling means; and performing a signal processing step including an adding operation for adding the received signal pair for arithmetically operating the coordinate values of the pointing device.

34. A point detecting method employing a point sensing area and a pointing device capable of moving over the point sensing area, further comprising steps for providing a plurality of first electromagnetic coupling means arranged in parallel in a first axial direction within the point sensing area;

providing a plurality of second electromagnetic coupling means arranged in parallel in a second axial direction intersected perpendicularly to the first axial direction;

transmitting a signal to the above space of the electromagnetic coupling means from one of both ends of the first axial direction of the second electromagnetic coupling means;

simultaneously receiving the signal generated by the electromagnetic function between the pointing device and the electromagnetic coupling means at both ends of the second axial direction of the first electromagnetic coupling means; and performing a signal processing step including an adding operation for adding the received signal pair for arithmetically operating the coordinate values of the pointing device.

35. A point detecting method employing a point sensing area and a pointing device capable of moving over the point sensing area, further comprising steps for providing first and second electromagnetic coupling means which are prevented from electromagnetic coupling with each other;

connecting an input terminal of a first amplifier to one end of the above first electromagnetic coupling means;

connecting an output terminal of the first amplifier to one end of the above second electromagnetic coupling means;

oscillating the first amplifier when a positive feedback loop is formed by the first amplifier, the pointing device, and the above described first and second electromagnetic coupling means;

connecting an input terminal of a second amplifier to the other end of the above first electromagnetic coupling means;

connecting an output terminal of the second amplifier to the other end of the above second electromagnetic coupling means;

oscillating the second amplifier when a positive feedback loop is formed by the second amplifier, the pointing device, and the above described first and second electromagnetic coupling means; and performing a signal processing step including an adding operation for adding the oscillated signal pair from the input terminals of the first and second amplifiers for arithmetically operating the coordinate values of the pointing device signal.

36. A point detecting method employing a point sensing area and a pointing device capable of moving over the point sensing area, further comprising steps for:

providing first and second electromagnetic coupling means which are prevented from electromagnetic coupling with each other;

connecting an input terminal of an amplifier to both ends of the first electromagnetic coupling means through an adder and an output terminal of the amplifier to both ends of the second electromagnetic coupling means;

oscillating the amplifier when a positive feedback loop is formed by the amplifier, the pointing device, and the above described first and second electromagnetic coupling means; and processing the oscillated signal from the input terminal of the above described amplifier to arithmetically operate the coordinate values of the pointing device.

37. A point detecting method which detects and processes the signal generated by electromagnetic function between a pointing device and a plurality of electromagnetic coupling means arranged in the point detecting direction so as to obtain the coordinate values of the pointing device, further comprising steps for:

providing one of the above described electromagnetic coupling means which includes a pair of loop coils arranged close to each other, each one of which has at least one connection end for transmitting or receiving the signal and at least one turning end, or a loop coil having a switching means to switch the positions of the connection end and the turning end;

when the pointing device is located above the region including one loop coil of the above described loop coil pair or at least the turning end of one switching position, receiving at least one of signals generated by the other loop coil or the other switching position, or transmitting an actuating signal to generate the signal by the other loop coil or the other switching position.

38. The point detecting method as set forth in claim 37, wherein the above described region including at least the turning end is defined from the centre of the above described electromagnetic coupling means to the above described turning end.

* * * * *